(12) United States Patent
Ramasubramonian et al.

(10) Patent No.: US 12,244,805 B2
(45) Date of Patent: Mar. 4, 2025

(54) CHROMA QUANTIZATION PARAMETER (QP) DERIVATION FOR VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Wei-Jung Chien, San Diego, CA (US); Han Huang, San Diego, CA (US); Yu Han, San Diego, CA (US); Bappaditya Ray, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/997,321

(22) Filed: Aug. 19, 2020

(65) Prior Publication Data
US 2021/0058620 A1 Feb. 25, 2021

Related U.S. Application Data

(60) Provisional application No. 62/911,870, filed on Oct. 7, 2019, provisional application No. 62/891,063, filed on Aug. 23, 2019.

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/176* (2014.11); *H04N 19/186* (2014.11); *H04N 19/44* (2014.11)

(58) Field of Classification Search
CPC .... H04N 19/176; H04N 19/70; H04N 19/186; H04N 19/124; H04N 19/44; H04N 19/117; H04N 19/46; H04N 19/136; H04N 19/96
See application file for complete search history.

(56) References Cited

U.S. PATENT DOCUMENTS 10,142,642 B2 11/2018 Zhang et al.
2013/0259141 A1* 10/2013 Van der Auwera .. H04N 19/134
375/240.29
(Continued)

FOREIGN PATENT DOCUMENTS

AU 2014216004 A1 3/2015
CN 104427339 A 3/2015
(Continued)

OTHER PUBLICATIONS

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.
(Continued)

*Primary Examiner* — Farhan Mahmud
(74) *Attorney, Agent, or Firm* — QUALCOMM Incorporated

(57) ABSTRACT

Techniques are described for decoding video data. A video decoder may determine chroma blocks in a chroma quantization group (QG) of the video data, determine a quantization parameter predictor that is the same for each of the chroma blocks of the chroma QG, determine an offset value that is the same for two or more of the chroma blocks of the chroma QG, determine a quantization parameter value for each of the two or more of the chroma blocks in the chroma QG based on the quantization parameter predictor and the offset value inverse quantize coefficients of one or more
(Continued)

residual blocks for the chroma blocks based on the determined quantization parameter value, generate the one or more residual blocks based on the inverse quantized coefficients, and reconstruct the chroma blocks based on the one or more residual blocks.

24 Claims, 10 Drawing Sheets

(51) Int. Cl.
    *H04N 19/186*     (2014.01)
    *H04N 19/44*     (2014.01)

(56) References Cited

U.S. PATENT DOCUMENTS

| | | | |
|---|---|---|---|
| 2014/0348227 A1* | 11/2014 | Lee | H04N 19/463 375/240.03 |
| 2015/0071344 A1 | 3/2015 | Tourapis et al. | |
| 2015/0071345 A1* | 3/2015 | Tourapis | H04N 19/157 375/240.03 |
| 2018/0020241 A1 | 1/2018 | Li et al. | |
| 2019/0020875 A1 | 1/2019 | Liu et al. | |
| 2019/0230356 A1 | 7/2019 | Chao et al. | |
| 2020/0413059 A1 | 12/2020 | Han et al. | |
| 2021/0006792 A1 | 1/2021 | Han et al. | |

FOREIGN PATENT DOCUMENTS

| | | | |
|---|---|---|---|
| WO | 2015187978 A1 | 12/2015 | |
| WO | 2019151257 A1 | 8/2019 | |

OTHER PUBLICATIONS

Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. 49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip, URL:http://phenix.int-evry.fr/mpegjdoc_end_user/documents/127Gothenburg/wg11/m49908-JVET-O2001-v14.zip.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), No. JVET-A1001, Feb. 24, 2016 (Feb. 24, 2016), XP030150000, 27 Pages, URL: http://phenix.int-evry.fr/jvet/.

International Search Report and Written Opinion—PCT/US2020/047212—ISAEPO—Oct. 2, 2020, 16 pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Lin, Z-Y., et al., "CE3-2.1.1 and CE3-2.1.2: Removing 2×2, 2×4, and 4×2 Chroma CBs", JVET-O0050-v2, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-5.

Ramasubramonian A.K., et al., "On Chroma Quantization Groups", JVET-P0361-v2, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-9.

* cited by examiner

CHROMA QUANTIZATION PARAMETER (QP) DERIVATION FOR VIDEO CODING

This application claims the benefit of U.S. Provisional Application No. 62/891,063, filed Aug. 23, 2019 and U.S. Provisional Application No. 62/911,870, filed Oct. 7, 2019, the entire contents of each are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for chroma quantization parameter (QP) derivation for video coding. As described in this disclosure, in some techniques, quantization groups (QGs) may have chroma blocks with different quantization parameter (QP) values, which may result in sub-optimal visual quality. One technique to ensure uniform QP values is to define small QGs, but this may negatively impact bandwidth efficiencies because more bits are needed to encode and decode a block.

This disclosure describes example techniques to improve the QP value derivation, such as for chroma blocks. In some examples, the result of the QP value derivation may be uniform QP values for a QG, but such result is not necessarily required in all examples. By improving the QP value derivation, the example techniques may improve visual quality, while promoting efficient bandwidth usage, thereby improving the overall operation of the video coding process.

In one example, the disclosure describes a method of decoding video data, the method comprising determining chroma blocks in a chroma quantization group (QG) of the video data, determining a quantization parameter predictor that is the same for each of the chroma blocks of the chroma QG, determining an offset value that is the same for two or more of the chroma blocks of the chroma QG, determining a quantization parameter value for each of the two or more of the chroma blocks in the chroma QG based on the quantization parameter predictor and the offset value, inverse quantizing coefficients of one or more residual blocks for the chroma blocks based on the determined quantization parameter value, generating the one or more residual blocks based on the inverse quantized coefficients, and reconstructing the chroma blocks based on the one or more residual blocks.

In one example, the disclosure describes a method of encoding video data, the method comprising determining chroma blocks in a chroma quantization group (QG) of the video data, determining a quantization parameter predictor that is the same for each of the chroma blocks of the chroma QG, determining a quantization parameter value for two or more of the chroma blocks in the chroma QG, determining an offset value that is the same for the two or more of the chroma blocks of the chroma QG based on the quantization parameter value and the quantization parameter predictor, quantizing coefficients of one or more residual blocks for the chroma blocks based on the determined quantization parameter value, and signaling information indicative of the quantized coefficients and the offset value.

In one example, the disclosure describes a device for decoding video data, the device comprising memory configured to store video data and processing circuitry coupled to the memory and configured to determine chroma blocks in a chroma quantization group (QG) of the video data, determine a quantization parameter predictor that is the same for each of the chroma blocks of the chroma QG, determine an offset value that is the same for two or more of the chroma blocks of the chroma QG, determine a quantization parameter value for each of the two or more of the chroma blocks in the chroma QG based on the quantization parameter predictor and the offset value, inverse quantize coefficients of one or more residual blocks for the chroma blocks based on the determined quantization parameter value, generate one or more residual blocks based on the inverse quantized coefficients, and reconstruct the chroma blocks based on the one or more residual blocks.

In one example, the disclosure describes a computer-readable storage medium storing instructions thereon that when executed cause one or more processors of a device for decoding video data to determine chroma blocks in a chroma quantization group (QG) of the video data, determine a quantization parameter predictor that is the same for each of the chroma blocks of the chroma QG, determine an offset value that is the same for two or more of the chroma blocks of the chroma QG, determine a quantization parameter value for the two or more of the chroma blocks in the chroma QG based on the quantization parameter predictor and the offset value, inverse quantize coefficients of one or more residual blocks for the chroma blocks based on the determined quantization parameter value, generate the one or more residual blocks based on the inverse quantized coefficients, and reconstruct the chroma blocks based on the one or more residual blocks.

The details of one or more examples are set forth in the accompanying drawings and the description below. Other features, objects, and advantages will be apparent from the description, drawings, and claims.

DETAILED DESCRIPTION

Figure 1:
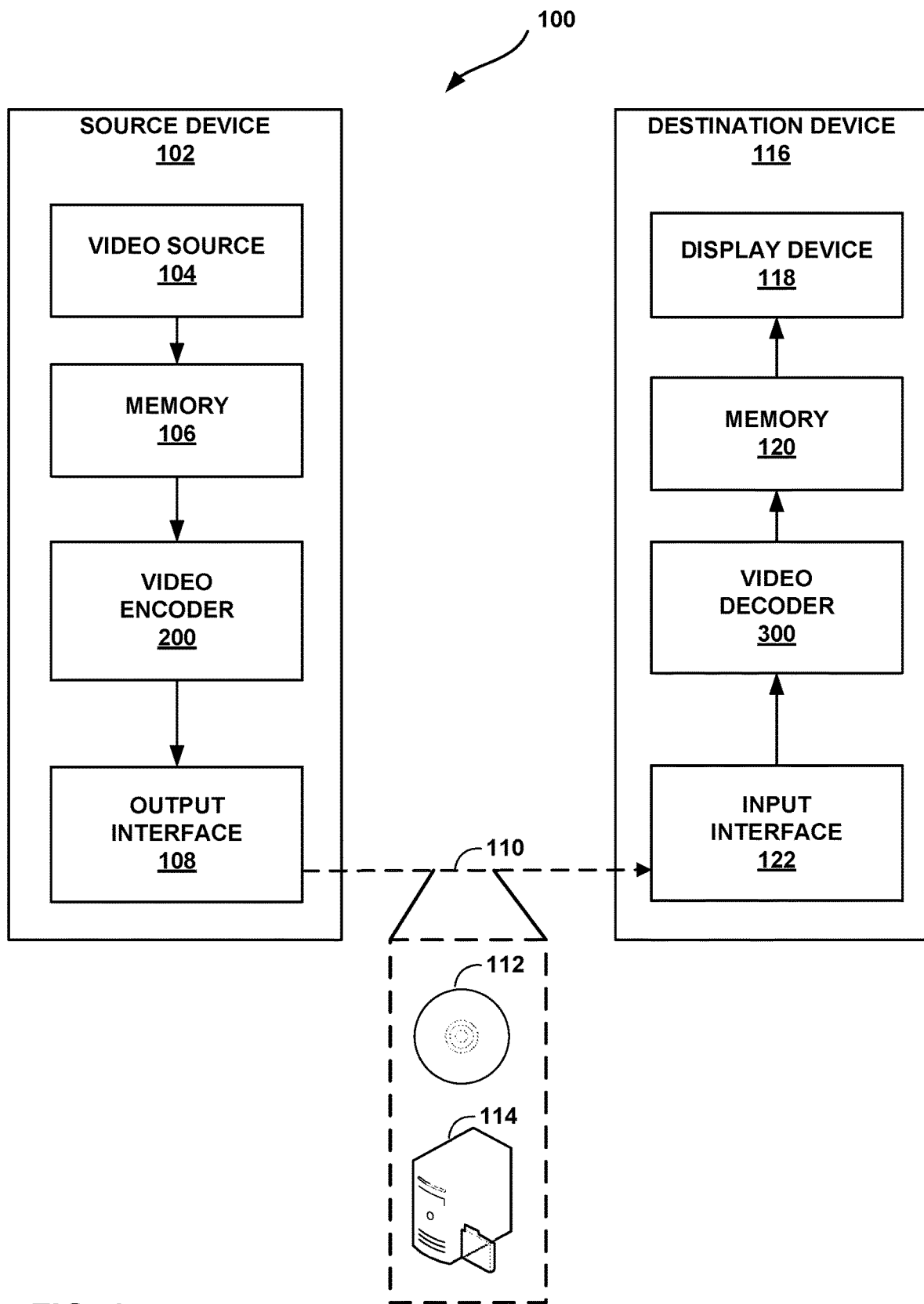
FIG. 1 is a block diagram illustrating an example video encoding and decoding system that may perform the techniques of this disclosure.

In video coding, a video encoder determines a prediction block for a current block, and determines a residual block based on a difference between the prediction block and the current block. The video encoder may transform the residual block from the sample domain to a transform domain (also called frequency domain), although skipping of the transform is possible, to generate coefficients of the residual block. The video encoder may then quantize the coefficients of the residual block according to a quantization parameter (QP) and signal information indicative of the quantized coefficients.

A video decoder may receive information indicative of the quantization parameter and the information indicative of the quantized coefficients. The video decoder may inverse quantize the quantized coefficient according to the quantization parameter and generate a residual block based on the inverse quantized coefficients (e.g., after an inverse transform of the inverse quantized coefficients). The video decoder may also determine a prediction block in the same manner as the video encoder and add the prediction block to the residual block to reconstruct the current block.

In some examples, the video encoder signals and the video decoder receives information indicative of the quantization parameter. The information indicative of the quantization parameter may be the quantization parameter itself or may be an offset value that is to be added to a quantization parameter predictor, where the quantization parameter predictor is a predictor based on one or more quantization parameters of previously coded blocks. As one example, a coding unit includes a luma coding block and two chroma coding blocks. A current block may be one of the two chroma coding blocks. In some examples, a quantization parameter for a luma coding block or a value based on the quantization parameter for the luma coding block may be the quantization parameter predictor for a chroma block that corresponds to the luma coding block.

In such examples, the video encoder and the video decoder may each determine the quantization parameter predictor for a current block (e.g., a chroma coding block). The video encoder may determine an offset, which is the difference between the actual quantization parameter and the quantization parameter predictor, and signal the offset. The video decoder may receive the offset value and add the offset value to the quantization parameter predictor to determine the quantization parameter for the current block.

In one or more examples described in this disclosure, rather than determining a quantization parameter on a chroma block-by-chroma block basis, it may be possible to determine a quantization parameter for a chroma quantization group (QG). For example, the chroma QG includes a plurality of chroma blocks. In such examples, the video encoder may signal information that defines a chroma QG. The quantization parameter predictor for all of the chroma blocks in the QG may be the same, and the offset value for two or more of the chroma blocks (including all of the chroma blocks) may be the same. In this way, the video encoder and the video decoder may determine the quantization parameter once for the chroma blocks in the QG and assign the quantization parameter to the chroma blocks in the QG. Accordingly, the video encoder and the video decoder may not need to repeatedly check for quantization parameter predictors for each chroma block in the chroma QG or signal and receive offsets for each chroma block in the chroma QG.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for deriving quantization parameter (QP) value (e.g., for a chroma coding block). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for deriving QP value (e.g., for a chroma coding block). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). A more recent draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 June-1 Jul. 2020, JVET-S2001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

For example, the luminance component includes luma blocks and the chrominance component includes chroma blocks. In dual tree partitioning, the partitioning of the luminance components into luma blocks and the partitioning of the chrominance components into chroma blocks may be different. As an example, video encoder 200 and video decoder 300 may be configured to partition a luma CTU and a chroma CTU in dual tree, generating luma blocks of the luma CTU and chroma blocks of the CTU with different partitions.

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

VVC may also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. VVC may provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, video encoder 200 may be configured to quantize coefficients based on a quantization parameter and video decoder 300 may be configured to inverse quantize coefficients based on the quantization parameter. In one or more examples, video decoder 300 may determine a quantization parameter for a chroma block (e.g., block of the chrominance component) based on a quantization parameter for a corresponding luma block (e.g., block of the luminance component). For example, the quantization parameter for the luma block or a value determined from the quantization parameter for the luma block may be a quantization parameter predictor for a chroma block. Video encoder 200 may signal and video decoder 300 may receive an offset value that video decoder 300 adds to the quantization parameter predictor to determine the quantization parameter for the chroma block.

The quantization parameter for the corresponding luma block is one example of a quantization parameter predictor. Another example of the quantization parameter predictor may be a quantization parameter of a neighboring chroma QG or an average or weighted average of quantization parameters of neighboring chroma QGs. Other ways in which to determine the quantization parameter predictor are possible.

In accordance with one or more examples described in this disclosure, video encoder 200 and video decoder 300 may determine a quantization group (QG), where a QG includes a plurality of chroma blocks. In one or more examples, the quantization parameter (e.g., parameter value) for the chroma blocks in the chroma QG may be equal to one another. For example, video encoder 200 and video decoder 300 may determine the quantization parameter predictor once for chroma blocks in the chroma QG and the offset value for each of the chroma blocks in the chroma QG may be the same. Therefore, the quantization parameter for each of the chroma blocks in the QG may be the same.

Because the quantization parameter predictor and the offset value are the same for the chroma blocks in the chroma QG, it may be possible for video decoder 300 to access a corresponding luma block one time to determine the quantization parameter predictor for a chroma block in a chroma QG, rather than accessing the corresponding luma block each time for each chroma block in a chroma QG, which can reduce the decoding time. Also, video encoder 200 may need to signal fewer offsets, which promotes bandwidth efficiencies.

In situations where it is desirable for the chroma blocks to have different quantization parameters, video encoder 200 and video decoder 300 may determine smaller sized chroma QGs to allow for different quantization parameters for different chroma blocks. In this way, the example techniques promote flexibility to allow for situations where chroma blocks are to have different quantization parameter by having smaller sized chroma QGs. Where chroma blocks are to have the same quantization parameters, however, the example techniques allow for larger sized chroma QGs with the benefit of reduced signaling overhead and reduced decoding time.

In some examples, as described in more detail, the offset value for the chroma blocks in the chroma QG may be the same for all blocks that satisfy some criteria. For example, the offset value may be the same for the chroma blocks in the chroma QG having a particular size or for which there is at least one non-zero coefficient for a corresponding residual block. Accordingly, in some examples, video encoder 200 and video decoder 300 may determine an offset value that is the same for two or more of the chroma blocks of the chroma QG (e.g., same for all chroma blocks that satisfy the criteria). However, it may be possible for the offset value to be the same for all chroma blocks in the chroma QG (e.g., where there is no criteria to satisfy).

Figure 2A:
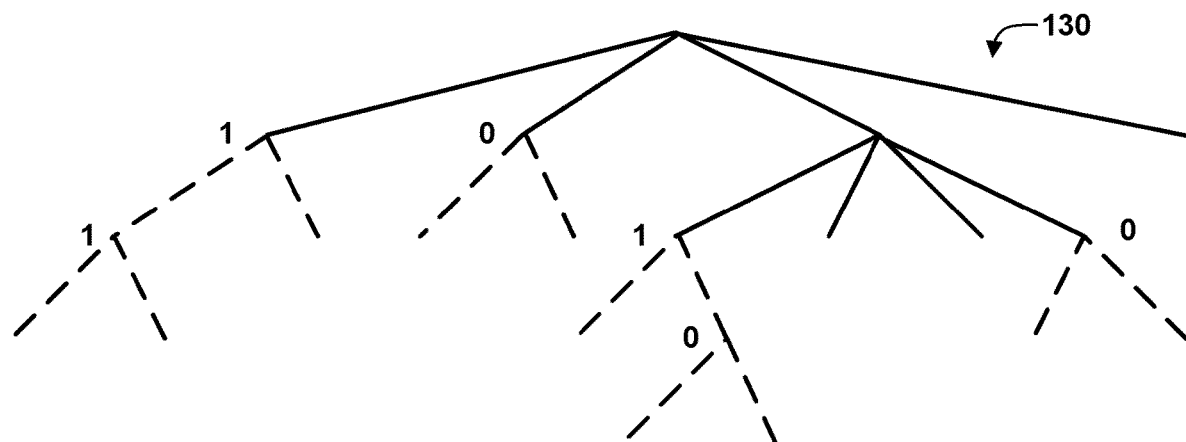
FIGS. 2A and 2B are conceptual diagrams illustrating an example quadtree binary tree (QTBT) structure, and a corresponding coding tree unit (CTU).
Figure 2B:
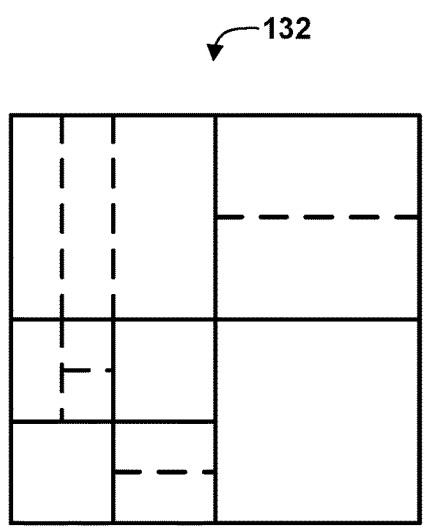

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
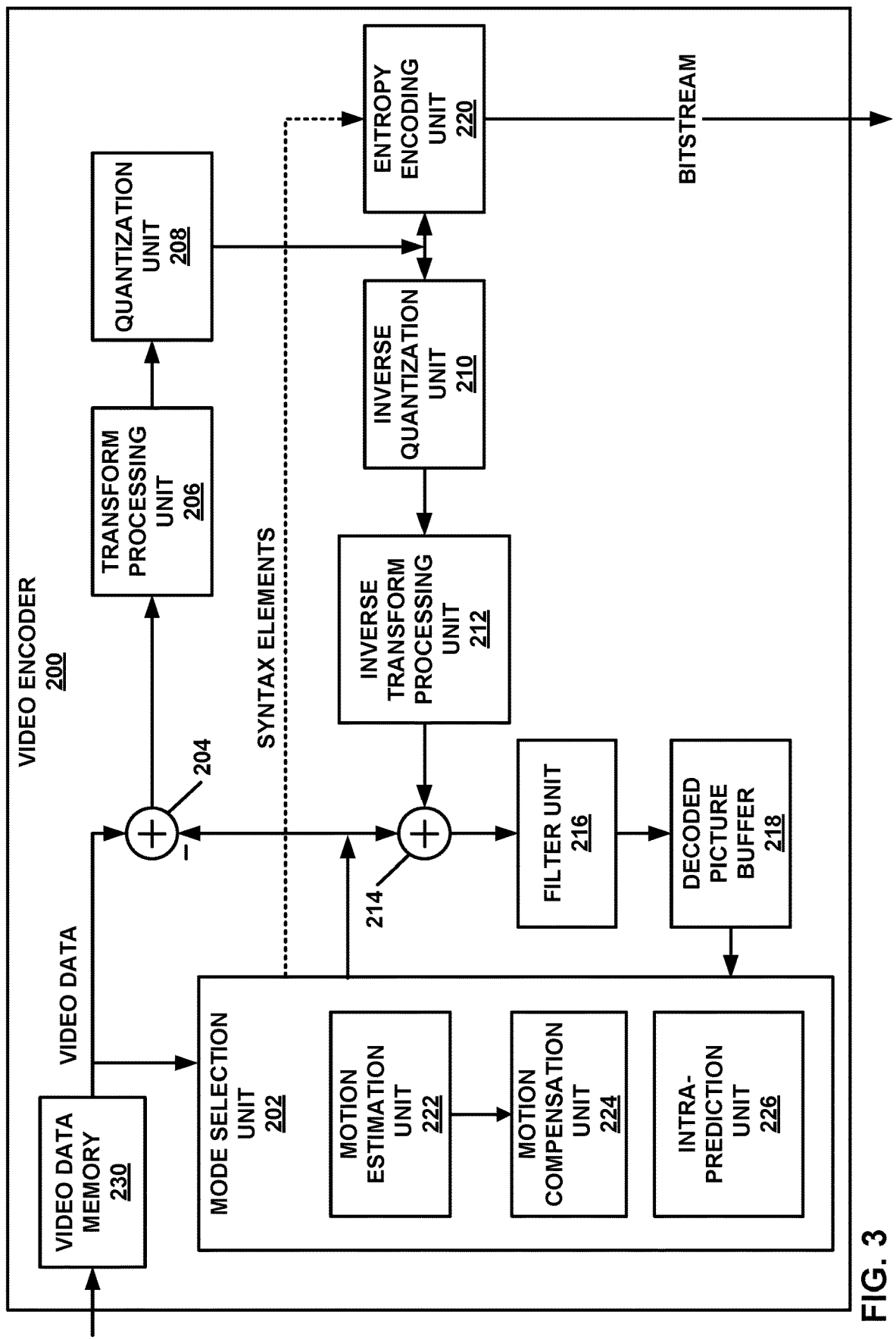
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

In one or more examples, quantization unit 208 in combination with mode selection unit 202 and entropy encoding unit 220 may be configured to perform the example techniques described in this disclosure. For example, rather than signaling the actual quantization parameter for a chroma block, mode selection unit 202 may cause entropy encoding unit 220 to signal an offset value indicative of a difference between a quantization parameter predictor and the quantization parameter for a chroma block.

In some examples, mode selection unit 202 may determine chroma blocks in a chroma quantization group (e.g., define a chroma QG that includes a plurality of chroma blocks). In some examples, the quantization parameter for two or more, including all, chroma blocks within the chroma QG, may be the same. For instance, mode selection unit 202 may determine a quantization parameter predictor for the chroma QG, where the quantization parameter predictor may be the same for each of the chroma blocks in the chroma QG.

Mode selection unit 202 may determine an offset value that is the same for two or more of the chroma blocks in the chroma QG (e.g., the offset value is based on the quantization parameter and the quantization parameter predictor). In some cases, there may be a criteria such as block size or whether there are non-zero coefficient values in a residual block for the chroma block or whether the chroma block does not precede the first chroma block in the QG that has non-zero coefficients that is to be satisfied, and the offset value may be same for the chroma blocks in the chroma QG that satisfy the criteria. However, having such criteria that needs to be satisfied is not needed in all cases, and in some examples, the offset value may be the same for each of the chroma blocks in the chroma QG. That is, in some examples, mode selection unit 202 may determine the offset value that is the same for all of the chroma blocks of the chroma QG. In some examples, mode selection unit 202 may determine the offset value that is the same for the two or more of the chroma blocks having a size greater than a threshold size or at least one non-zero coefficient for corresponding residual blocks. In some examples, mode selection unit 202 may determine that the offset value is the same for all blocks that follow the first block in the QG that has non-zero coefficients, including the first block in the QG that has non-zero coefficients.

In this way, mode selection unit 202 may not need to determine the quantization parameter repeatedly for each of the chroma blocks or signal offset values for each of the chroma blocks, which promotes bandwidth efficiencies. For example, mode selection unit 202 may determine the quantization parameter for only one chroma block in the chroma QG and assign the determined quantization parameter for the two or more chroma blocks in the chroma QG.

There may be various ways in which mode selection unit 202 may determine the quantization parameter predictor. As one example, mode selection unit 202 may determine a chroma sample from one of the chroma blocks, determine a corresponding luma block to the chroma blocks based on the determined chroma sample, and determine the quantization parameter predictor based on a quantization parameter for the corresponding luma block. As another example, mode selection unit 202 may determine the quantization parameter predictor based on quantization parameter of a neighboring chroma QG.

In some examples, the example techniques described in this disclosure may be applicable to where there is dual tree partitioning. For example, in dual tree partitioning, video encoder 200 and video decoder 300 may partition a luma CTU and a chroma CTU in dual tree generating luma blocks of the luma CTU and chroma blocks of the CTU with different partitions. In some examples, the example techniques described in this disclosure may be applicable to when dual tree partitioning is used.

Quantization unit 208 may quantize the coefficients of one or more residual blocks for the chroma blocks based on the determined quantization parameter. Entropy encoding unit 220 may signal information indicative of the quantized coefficients and the offset value.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform one or more, including combinations, of the example techniques described in this disclosure. For example, video encoder 200 may be configured to encode a current block based on chroma quantization parameter (QP) derivation techniques described in this disclosure.

Figure 4:
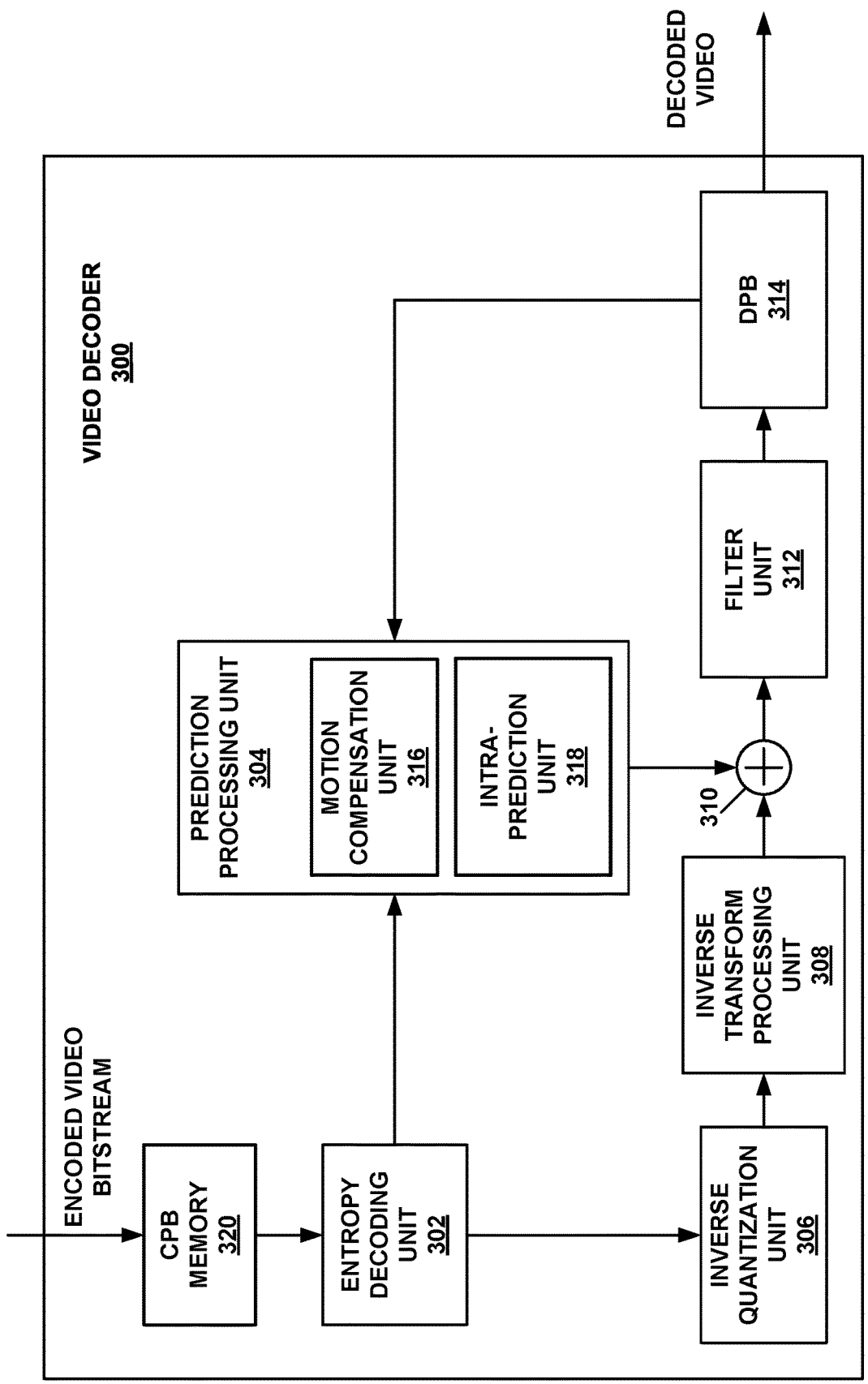
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

In one or more examples, inverse quantization unit 306 in combination with prediction processing unit 304 may be configured to perform the example techniques described in this disclosure. For example, prediction processing unit 304 may determine chroma blocks in a chroma quantization group (QG). As one example, prediction processing unit 304 may receive information signaled by video encoder 200 indicative of which chroma blocks belong in a quantization group.

In some examples, the quantization parameter for two or more, including all, chroma blocks within the chroma QG may be the same. For instance, prediction processing unit 304 may determine a quantization parameter predictor for the chroma QG, where the quantization parameter predictor may be the same for each of the plurality of chroma blocks in the chroma QG.

Prediction processing unit 304 may determine an offset value that is the same for two or more of the chroma blocks in the chroma QG (e.g., the offset value is based on the quantization parameter and the quantization parameter predictor). In some cases, there may be criteria such as block size or whether there are non-zero coefficient values in a residual block for the chroma block that is to be satisfied, and the offset value may be same for the chroma blocks in the chroma QG that satisfy the criteria. However, having such criteria that needs to be satisfied is not needed in all cases, and in some examples, the offset value may be the same for each of the chroma blocks in the chroma QG. That is, in some example, prediction processing unit 304 may determine the offset value that is the same for all of the chroma blocks of the chroma QG. In some examples, prediction processing unit 304 may determine the offset value that is the same for the two or more of the chroma blocks having a size greater than a threshold size or at least one non-zero coefficient for corresponding residual blocks.

In this way, prediction processing unit 304 may not need to determine the quantization parameter repeatedly for each of the chroma blocks, which reduces computation time, or receive offset values for each of the chroma blocks, which promotes bandwidth efficiencies. For example, prediction processing unit 304 may determine the quantization parameter for only one chroma block in the chroma QG and assign the determined quantization parameter for one or more other chroma blocks in the chroma QG, such that multiple chroma blocks in the chroma QG have the same quantization parameter.

There may be various ways in which prediction processing unit 304 may determine the quantization parameter predictor. As one example, prediction processing unit 304 may determine a chroma sample from one of the chroma blocks, determine a corresponding luma block to the chroma blocks based on the determined chroma sample, and determine the quantization parameter predictor based on a quantization parameter for the corresponding luma block. As another example, prediction processing unit 304 may determine the quantization parameter predictor based on quantization parameter of neighboring chroma QG.

In some examples, the example techniques described in this disclosure may be applicable to where there is dual tree partitioning. For example, in dual tree partitioning, video encoder 200 and video decoder 300 may partition a luma CTU and a chroma CTU in dual tree generating luma blocks of the luma CTU and chroma blocks of the CTU with different partitions. In some examples, the example techniques described in this disclosure may be applicable to when dual tree partitioning is used.

Inverse quantization unit 306 may inverse quantize the coefficients of one or more residual blocks for the chroma blocks based on the determined quantization parameter. As described below, inverse transform processing unit 308 may generate the one or more residual blocks based on the inverse quantized coefficients, and reconstruction unit 310 may reconstruct the chroma blocks based on the one or more residual blocks.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform one or more, including combinations, of the example techniques described in this disclosure. For example, video decoder 300 may be configured to decode a current block based on chroma quantization parameter (QP) derivation techniques described in this disclosure.

As described above, video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Another video coding standard is the High-Efficiency Video Coding (HEVC), which was finalized by the Joint Collaboration Team on Video Coding (JCT-VC) of ITU-T Video Coding Experts Group (VCEG) and ISO/IEC Motion Picture Experts Group (MPEG) in April 2013.

The Joint Video Experts Team (WET), a collaborative team formed by MPEG and ITU-T Study Group 16's VCEG is recently working on a new video coding standard to be known as Versatile Video Coding (VVC). VVC may provide an improvement in compression performance over the existing HEVC standard, aiding in deployment of higher-quality video services and emerging applications such as 360° omnidirectional immersive multimedia and high-dynamic-range (HDR) video. The development of the VVC standard is expected to be completed in 2020.

As described above, one aspect of video coding is based on quantization parameters. Quantization parameter (QP) values are used to determine the step size to be used for quantizing/inverse-quantizing the coefficients. QP values are specified in the range of −QpBdOffset to 63, inclusive, where 63 is the maximum QP value. QpBdOffset is specified as a fixed value for a particular bit depth, derived as 6*(bitDepth−8). The QP prime value, calculated by adding QpBdOffset to the specified QP value, is used to derive the actual step size. For ease of description, the QP and QP prime value may be used interchangeably in this disclosure with the understanding that the QP value may be used (e.g., may be only used) in most QP derivation processes, and the QP prime value may be used (e.g., may be only used) just before determining the step size. A change of QP value by 1 roughly indicates a change in the step size by 12%. A change of QP value by 6 corresponds to changing the step size by a factor of 2. In some examples, the higher the quantization parameter value may be the larger the quantization step size becomes and the representation of the coefficients that are quantized becomes coarser.

As described above, in some examples, quantization groups (QGs) may be used. The following provides further description of QGs. Quantization groups are regions of a picture where a QP offset parameter (e.g., offset value described above) may be signaled. That is, video encoder 200 may signal and video decoder 300 may receive a QP offset parameter that is applicable for a region defined by a QG. The QP offset parameter, when signaled, may be used to derive the QP values of one or more coding blocks in the quantization group. The QP offset parameter may be referred to as a delta QP value.

Video encoder 200 may signal information indicative of quantization groups based on maximum depth from the CTB (coding tree block) level or using a variable that is indicative of the number of samples of the group relative to the CTB size. As described above, a coding tree unit (CTU) may include three blocks, namely luma (Y) and two chroma samples (Cb and Cr) and associated syntax elements. Each block (e.g., luma and chroma blocks of a CTU) may be referred to as coding tree block (CTB). In some examples, the QGs may be based on the maximum depth from the CTB (e.g., the QGs can be derived based on the maximum depth of the CTB). In some examples, the QGs may be derived using a variable that is indicative of the number of samples in the QG relative to the CTB size. For example, as described above, video encoder 200 and video decoder 300 may determine chroma blocks in a chroma QG. In some examples, video encoder 200 and video decoder 300 may determine chroma blocks in a chroma QG based on CTB size.

In some techniques, the QP values, at quantization groups, may be signaled (e.g., only signaled) for the first block in the quantization group that has non-zero coefficients. For blocks in a quantization group that are before the first block with non-zero coefficients, the QP value is derived to be a predicted QP value. Blocks with zero coefficients do not need any QP value as there are no coefficients to be quantized/inverse-quantized. However, this QP value is used in the deblocking process in determining some parameters of the deblocking filters to be applied. For example, rather than using the QP value for quantizing zero coefficients (which do not need quantizing as the values are already zero), the QP value may be used to determine parameters of deblocking filters that are applied to a reconstructed block.

Typically, QG refers to luma QG where it is specified also as a region where the coding blocks have the same predicted QP value. For example, in a luma QG, the coding blocks have the same predicted QP value. However, in some other techniques, chroma QGs may have had different QP values (e.g., different quantization parameters). In accordance with one or more examples described this disclosure, the quantization parameter may be the same for each of the chroma blocks in a chroma QG.

The following describes some examples of signaling of quantization parameters. In VVC Draft 6, the following are the syntax elements that are used for derivation of the QP values for luma and chroma.

The following are the syntax elements in the sequence parameter set (SPS).

| | |
|---|---|
| min_qp_prime_ts_minus4 | ue(v) |

The syntax element min_qp_prime_ts_minus4 is used to derive the minimum QP value for the transform skip mode.

| | |
|---|---|
| if( ChromaArrayType != 0 ) { | |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_out_val[ i ][ j ] | ue(v) |
|     } | |
|   } | |
| } | |

The syntax elements above are used to specify the mapping table to derive a chroma QP value from a luma QP value for the Cb, Cr, and joint Cb-Cr components.

| | |
|---|---|
| sps_ladf_enabled_flag | u(1) |
| if ( sps_ladf_enabled_flag ) { | |
|   sps_num_ladf_intervals_minus2 | u(2) |
|   sps_ladf_lowest_interval_qp_offset | se(v) |
|   for( i = 0; i < sps_num_ladf_intervals_minus2 + 1; i++ ) { | |
|     sps_ladf_qp_offset[ i ] | se(v) |
|     sps_ladf_delta_threshold_minus1[ i ] | ue(v) |
|   } | |
| } | |

The QP-value related syntax elements in the above syntax table apply to luma adaptive QP offsets to be applied to a luma deblocking process.

The following are syntax elements in a picture parameter set (PPS).

| | |
|---|---|
| init_qp_minus26 | se(v) |
| if( sps_transform_skip_enabled_flag ) | |
|     log2_transform_skip_max_size_minus2 | ue(v) |
| cu_qp_delta_enabled_flag | u(1) |
| if( cu_qp_delta_enabled_flag ) | |
|     cu_qp_delta_subdiv | ue(v) |
| pps_cb_qp_offset | se(v) |
| pps_cr_qp_offset | se(v) |
| pps_joint_cbcr_qp_offset | se(v) |
| pps_slice_chroma_qp_offsets_present_flag | u(1) |
| cu_chroma_qp_offset_enabled_flag | u(1) |
| if( cu_chroma_qp_offset_enabled_flag ) { | |
|     cu_chroma_qp_offset_subdiv | ue(v) |
|     chroma_qp_offset_list_len_minus1 | ue(v) |
|     for( i = 0; i <= chroma_qp_offset_list_len_minus1; i++ ) { | |
|         cb_qp_offset_list[ i ] | se(v) |
|         cr_qp_offset_list[ i ] | se(v) |
|         joint_cbcr_qp_offset_list[ i ] | se(v) |
|     } | |
| } | |

Video decoder 300 may use the syntax elements in the above table to derive an initial QP for slices that refer to the PPS and specify the quantization groups for luma and chroma. The syntax elements may also specify a table of offset values to indicate CU chroma offsets.

The following are syntax elements in a slice header.

| | |
|---|---|
| slice_qp_delta | se(v) |
| if( pps_slice_chroma_qp_offsets_present flag ) { | |
|     slice_cb_qp_offset | se(v) |
|     slice_cr_qp_offset | se(v) |
|     if( sps_joint_cbcr_enabled_flag ) | |
|         slice_joint_cbcr_qp_offset | se(v) |
| } | |

The syntax elements in the above table specify further deltas to the initial QP of the slices for both luma and chroma components.

The following describes syntax elements of a transform unit.

| | |
|---|---|
| if( ( CbWidth[ chType ][ x0 ][ y0 ] > 64 \|\| | |
| CbHeight[ chType ][ x0 ][ y0 ] > 64 \|\| | |
|     tu_cbf_luma[ x0 ][ y0 ] \|\| tu_cbf_cb[ x0 ][ y0 ] \|\| | |
| tu_cbf_cr[ x0 ][ y0 ] ) && | |
|     treeType != DUAL_TREE_CHROMA ) { | |
|     if( cu_qp_delta_enabled_flag && | |
|     !IsCuQpDeltaCoded ) { | |
|         cu_qp_delta_abs | ae(v) |
|         if( cu_qp_delta_abs ) | |
|             cu_qp_delta_sign_flag | ae(v) |
|     } | |
| } | |
| if( ( tu_cbf_cb[ x0 ][ y0 ] \|\| tu_cbf_cr[ x0 ][ y0 ] ) { | |
|     if( cu_chroma_qp_offset_enabled_flag && | |
|     !IsCuChromaQpOffsetCoded) { | |
|         cu_chroma_qp_offset_flag | ae(v) |
|         if( cu_chroma_qp_offset_flag && | |
|         chroma_qp_offset_list_len_minus1 > 0 | |
| ) | |
|             cu_chroma_qp_offset_idx | ae(v) |
|     } | |
| } | |

The syntax elements in the above table specify the CU-level QP offsets for luma and chroma components that video decoder 300 uses to derive the QP values for the quantization groups.

The following describes quantization parameter derivation for luma and chroma. In VVC Draft 6, video encoder 200 and/or video decoder 300 may derive the QP value for luma and chroma as follows. For luma, video decoder 300 may derive the slice QP from the initial QP (signaled in the PPS) and the QP offsets (signaled in the slice). A quantization group is specified, and for each QP, video decoder 300 may derive a $QP_{Y\_PRED}$. Based on the relative location of the quantization group in its brick and its CTB row, the value of $QP_{Y\_PRED}$ may vary. Video decoder 300 may derive the $QP_Y$ value from $QP_{Y\_PRED}$ and deltaQP signaled for the quantization group.

In some examples, $QP_{Y\_PRED}$ is derived for all coding blocks in a quantization group. However, deltaQP may only be signaled for blocks under certain conditions. Therefore, video decoder 300 may derive the QP values only for certain cases. For instance, if deltaQP is not signaled, then video decoder 300 may set the QP value equal to $QP_{Y\_PRED}$. If deltaQP is signaled, then video decoder 300 may derive the QP value based on $QP_{Y\_PRED}$ and deltaQP.

Video decoder 300 may derive the chroma QP from a mapped value of the luma QP of the sample collocated with the center of the chroma block and any QP offset that may be applicable to the coding block. Similar to luma, chroma QP offset is signaled for the first chroma coding block in the chroma quantization group that has non-zero coefficients.

The following describes some examples of quantization parameter derivation in VVC.

The derivation process for QP values in VVC is reproduced below.

Inputs to this process are:
a luma location (xCb,yCb) specifying the top-left luma sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location (xQg, yQg), specifies the top-left luma sample of the current quantization group relative to the top left luma sample of the current picture. The horizontal and vertical positions xQg and yQg are set equal to CuQgTopLeftX and CuQgTopLeftY, respectively.

NOTE—: The current quantization group is a rectangular region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:
   If one or more of the following conditions are true, $qP_{Y\_PREV}$ is set equal to $SliceQp_Y$:
   The current quantization group is the first quantization group in a slice.
   The current quantization group is the first quantization group in a brick.
   The current quantization group is the first quantization group in a CTB row of a brick and entropy_coding_sync_enabled_flag is equal to 1.

Otherwise, $qP_{Y\_PREV}$ is set equal to the luma quantization parameter $Qp_Y$ of the last luma coding unit in the previous quantization group in decoding order.

2. The derivation process for neighbouring block availability as specified in clause 6.4.4 is invoked with the location (xCurr, yCurr) set equal to (xCb,yCb), the neighbouring location (xNbY, yNbY) set equal to (xQg−1, yQg), checkPredModeY set equal to FALSE, and cIdx set equal to 0 as inputs, and the output is assigned to availableA. The variable $qP_{Y\_A}$ is derived as follows:
   If one or more of the following conditions are true, $qP_{Y\_A}$ is set equal to $qP_{Y\_PREV}$:
   availableA is equal to FALSE.
   The CTB containing the luma coding block covering the luma location (xQg−1, yQg) is not equal to the CTB containing the current luma coding block at (xCb,yCb), i.e. all of the following conditions are true:
      (xQg−1)>>CtbLog2SizeY is not equal to (xCb)>>CtbLog2SizeY
      (yQg)>>CtbLog2SizeY is not equal to (yCb)>>CtbLog2SizeY
   Otherwise, $qP_{Y\_A}$ is set equal to the luma quantization parameter $Qp_Y$ of the coding unit containing the luma coding block covering (xQg−1, yQg).

3. The derivation process for neighbouring block availability as specified in clause 6.4.4 is invoked with the location (xCurr, yCurr) set equal to (xCb,yCb), the neighbouring location (xNbY, yNbY) set equal to (xQg, yQg−1), checkPredModeY set equal to FALSE, and cIdx set equal to 0 as inputs, and the output is assigned to availableB. The variable $qP_{Y\_B}$ is derived as follows:
   If one or more of the following conditions are true, $qP_{Y\_B}$ is set equal to $qP_{Y\_PREV}$:
   availableB is equal to FALSE.
   The CTB containing the luma coding block covering the luma location (xQg,yQg−1) is not equal to the CTB containing the current luma coding block at (xCb,yCb), i.e. all of the following conditions are true:
      (xQg)>>CtbLog2SizeY is not equal to (xCb)>>CtbLog2SizeY
      (yQg−1)>>CtbLog2SizeY is not equal to (yCb)>>CtbLog2SizeY
   Otherwise, $qP_{Y\_B}$ is set equal to the luma quantization parameter $Qp_Y$ of the coding unit containing the luma coding block covering (xQg,yQg−1).

4. The predicted luma quantization parameter $qP_{Y\_PRED}$ is derived as follows:
   If all the following conditions are true, then $qP_{Y\_PRED}$ is set equal to the luma quantization parameter $Qp_Y$ of the coding unit containing the luma coding block covering (xQg,yQg−1):
      availableB is equal to TRUE.
      the current quantization group is the first quantization group in a CTB row within a brick and entropy_coding_sync_enabled_flag is equal to 0
   Otherwise, $qP_{Y\_PRED}$ is derived as follows:

$$qP_{Y\_PRED} = (qP_{Y\_A} + qP_{Y\_B} + 1) >> 1 \quad (8\text{-}932)$$

The variable $Qp_Y$ is derived as follows:

$$Qp_Y = ((qP_{Y\_PRED} + CuQpDeltaVal + 64 + 2*QpBdOffset_Y) \% (64 + QpBdOffset_Y)) - QpBdOffset_Y \quad (8\text{-}933)$$

The luma quantization parameter $Qp'_Y$ is derived as follows:

$$Qp'_Y = Qp_Y + QpBdOffset_Y \quad (8\text{-}934)$$

When ChromaArrayType is not equal to 0 and treeType is equal to SINGLE_TREE or DUAL_TREE_CHROMA, the following applies:
   When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).
   The variables $qP_{Cb}$, $qP_{Cr}$ and $qP_{CbCr}$ are derived as follows:

$$qPi_{Chroma} = \text{Clip3}(-QpBdOffset_C, 63, Qp_Y) \quad (8\text{-}935)$$

$$qPi_{Cb} = \text{ChromaQpTable}[0][qPi_{Chroma}] \quad (8\text{-}936)$$

$$qPi_{Cr} = \text{ChromaQpTable}[1][qPi_{Chroma}] \quad (8\text{-}937)$$

$$qPi_{CbCr} = \text{ChromaQpTable}[2][qPi_{Chroma}] \quad (8\text{-}938)$$

The chroma quantization parameters for the Cb and Cr components, $Qp'_{Cb}$ and $Qp'_{Cr}$, and joint Cb-Cr coding $Qp'_{CbCr}$ are derived as follows:

$$Qp'_{Cb} = \text{Clip3}(-QpBdOffset_C, 63, qP_{Cb} + pps\_cb\_qp\_offset + slice\_cb\_qp\_offset + CuQpOffset_{Cb}) + QpBdOffset_C \quad (8\text{-}939)$$

$$Qp'_{Cr} = \text{Clip3}(-QpBdOffset_C, 63, qP_{Cr} + pps\_cr\_qp\_offset + slice\_cr\_qp\_offset + CuQpOffset_{Cr}) + QpBdOffset_C \quad (8\text{-}940)$$

$$Qp'_{CbCr} = \text{Clip3}(-QpBdOffset_C, 63, qP_{CbCr} + pps\_cbcr\_qp\_offset + slice\_cbcr\_qp\_offset + CuQpOffset_{CbCr}) + QpBdOffset_C \quad (8\text{-}941)$$

There may be certain issues with deriving QPs or QGs. In some cases, a chroma quantization group (indicated by syntax elements such as cu_chroma_qp_offset_subdiv) may correspond to multiple luma quantization groups (i.e., the collocated luma samples of the various chroma samples in the quantization group belong to multiple luma quantization groups). When luma delta QP is signaled at the QG-level, the resultant coding blocks of the chroma QG may have different QP values.

In some examples, the issue of coding blocks of the chroma QG having different QP values may be present in dual-tree coding conditions, where the partitioning structure of chroma and luma may be very different. For example, chroma coding blocks in the chroma QG that have non-zero coefficients may have different QP values. This results in quantization groups that have coding blocks with different QP values. Quantization groups that have coding blocks with different QP values may result in cases where texture in regions corresponding to a QG may have different quality, resulting in sub-optimal visual quality of the video. Alternately or additionally, the chroma quantization groups are specified to be very small such that uniform QP values may be maintained in the chroma quantization group. However, specifying such small quantization groups may result in more bits being transmitted (e.g., negatively impacting bandwidth efficiency).

Figure 5:
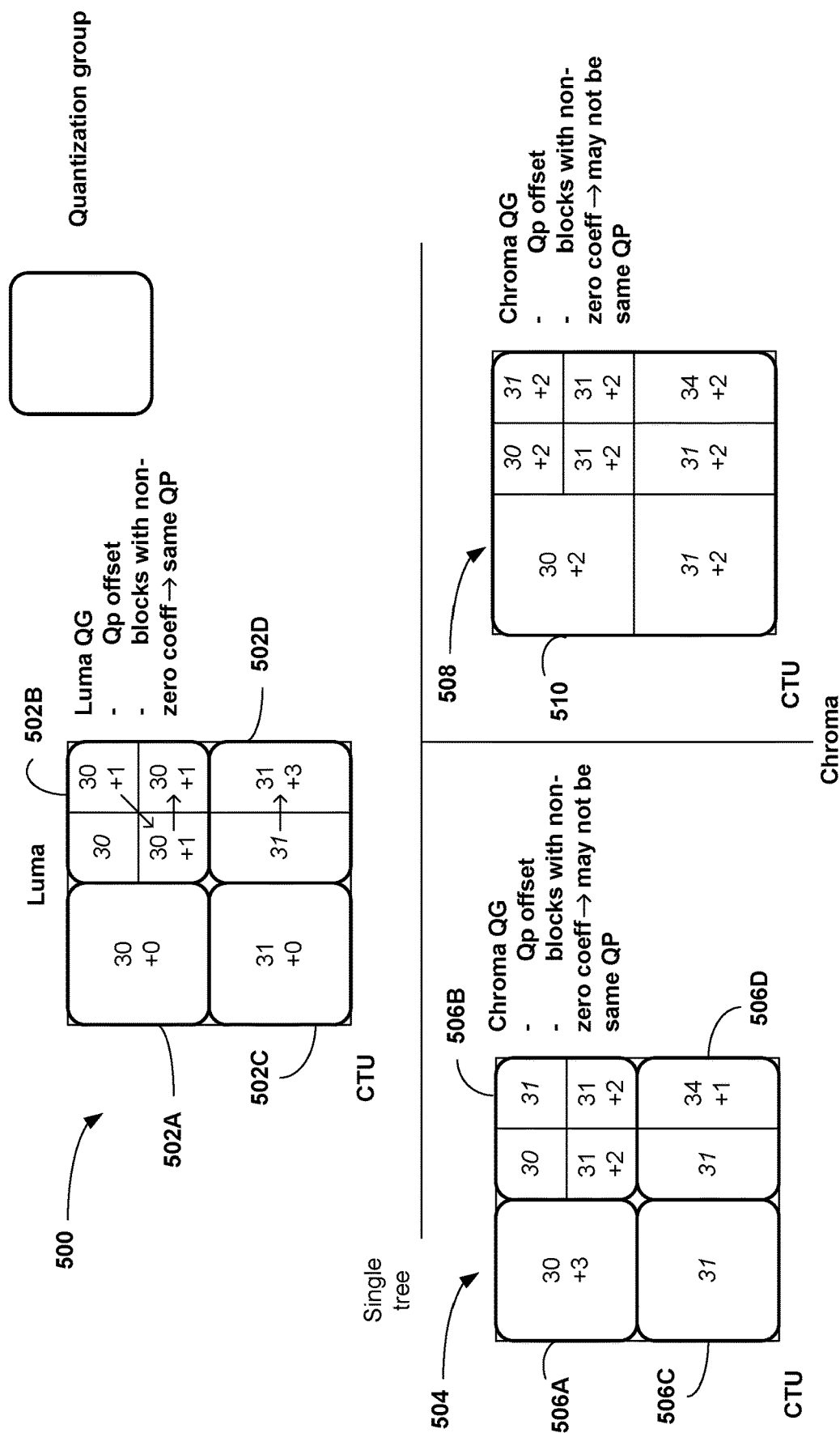
FIG. 5 is a conceptual diagram illustrating an example of chroma quantization parameters (QPs) derived for two cases for chroma quantization groups in a single tree configuration.
Figure 6:
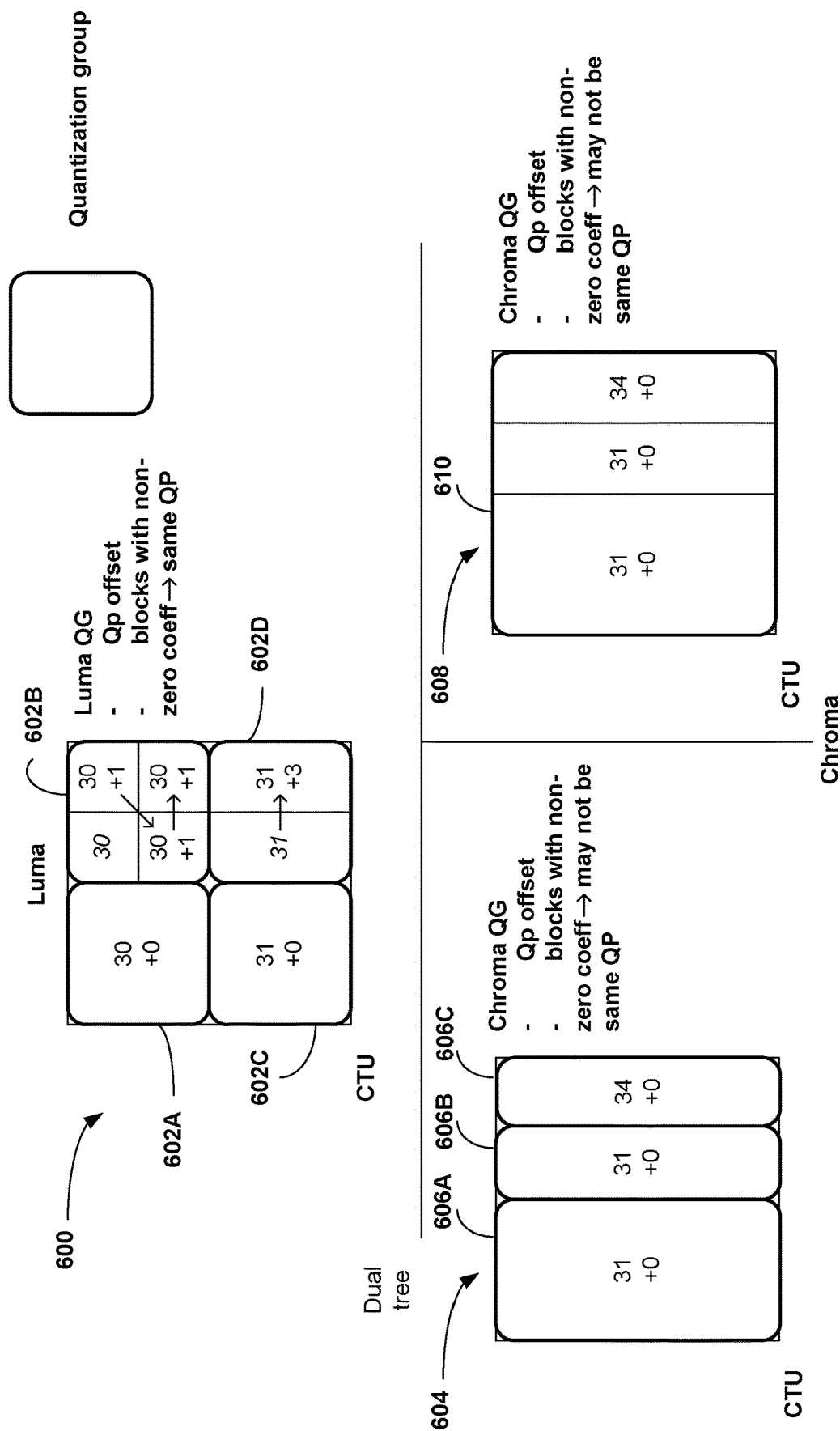
FIG. 6 is a conceptual diagram illustrating an example of chroma QPs derived for two cases for chroma quantization groups in a dual tree configuration.

FIGS. 5 and 6 illustrate how the QPs of blocks within a chroma QG are not the same when the luma QP varies in the collocated blocks. FIG. 5 is a conceptual diagram illustrating an example of chroma QP derived for two cases for chroma quantization groups in a single tree configuration. FIG. 6 is a conceptual diagram illustrating an example of chroma QP derived for two cases for chroma quantization groups in a dual tree configuration. FIGS. 5 and 6 may represent an example from virtual test model (VTM 6.0).

In FIGS. 5 and 6, the chroma QPs derived for coding blocks within a chroma QG may not be the same. In FIGS. 5 and 6, italicized font indicates blocks with zero coefficients. The first of the two numbers in each block indicates a predicted QP value and the number "+n" indicates an offset value. Accordingly, 30+1 indicates that the QP value for the block is 31.

Additional techniques related to chroma delta quantization parameter (QP) in video coding can be found in U.S. Provisional Application No. 62/871,028, filed Jul. 5, 2019, U.S. Non-Provisional application Ser. No. 16/918,741, filed Jul. 1, 2020, U.S. Provisional Application No. 62/868,771, filed Jun. 28, 2019, and U.S. Non-Provisional application Ser. No. 16/912,232, filed Jun. 25, 2020.

For example, FIG. 5 illustrates luma coding block (e.g., luma CTU) 500 that includes four luma quantization groups (QGs) 502A, 502B, 502C, and 502D. QG 502A has a QP value of 30 (e.g., initial quantization parameter of 30 with an offset of 0) and may encompass one luma block. QG 502B has a QP value of 31 (e.g., initial quantization parameter of 31 and an offset of 0) and may encompass one luma block. QG 502C has four QP values: 30 for the top-left luma block, 31 for the top-right luma block (e.g., 30+1), 31 for the bottom-left luma block (e.g., 30+1), and 31 for the bottom-right luma block (e.g., 30+1). In this example, the initial quantization parameter for each luma block in QG 502C is the same; however, an offset is not added to the top-left luma block because the top-left luma block in QG 502C does not have any non-zero coefficients in its corresponding residual block (e.g., after transform there are only zero coefficients). QG 502D has two QP values: 31 for the left luma block and 34 for the right luma block (e.g., 31+3). In this example, the initial quantization parameter for each luma block in QG 502D is the same; however, an offset is not added to the left luma block because the left luma block in QG 502D does not have any non-zero coefficients in its corresponding residual block.

In a single tree configuration, the chroma CTU that corresponds to luma CTU 500 may be partitioned in the same way. For example, FIG. 5 illustrates chroma CTU 504 and chroma CTU 508. Chroma CTU 504 is one example of a corresponding chroma CTU to luma CTU 500, and chroma CTU 508 is another example of a corresponding chroma CTU to luma CTU 500.

In the example illustrated in FIG. 5, chroma CTU 504 includes four QGs 506A, 506B, 506C and 506D. In some examples, to determine the QP value for each of QGs 506A-506D, video decoder 300 may access respective luma blocks and add an offset. For example, for QG 506A, video decoder 300 may determine the QP value of a corresponding QG 502A (e.g., a quantization parameter predictor), and add an offset (e.g., signaled by video encoder 200). For instance, the QP value for QG 502A is 30, which is the quantization parameter predictor for QG 506A, to which video decoder 300 adds an offset of 3 to determine the QP value of 33 for QG 506A.

As another example, QG 506C includes four chroma blocks. As illustrated, for the bottom-left chroma block in 506C, the quantization parameter predictor is 31 because the QP value for bottom-left luma block in QG 502C is 31. Video decoder 300 may add an offset of 2 (e.g., as signaled by video encoder 200) to determine the QP value of 33 for the bottom-left chroma block in QG 506C. Again, the italicized numbers in the QGs 506A-506D represent chroma blocks for which there are no non-zero coefficients in the corresponding residual block (i.e., the residual blocks only have zero valued coefficients). No offset may be added to the initial quantization parameter for chroma blocks with no non-zero coefficients if all the preceding blocks in the QG also have non-zero coefficients.

In the example of chroma CTU 508, rather than chroma CTU 508 being divided into four QGs, chroma CTU 508 may be divided into only one QG 510. That is, the chroma blocks in chroma QG 510 comprise the chroma blocks of the CTU 508 and the chroma QG 510 includes all of chroma blocks of the CTU 510. In this example, for each of the chroma blocks of chroma CTU 508, video decoder 300 may access corresponding luma blocks and add an offset that is the same for each of the chroma blocks. In the example of FIG. 5, the offset is 2 for chroma CTU 508. For example, as shown in FIG. 5 for the top-left chroma block of CTU 508, the QP value is 30+2 because the QP value of the top-left luma block of CTU 500 is 30, which is the quantization parameter predictor, and 2 is the offset. Similarly, for the bottom-right block of chroma CTU 508, the QP value is 34+2 because the QP value of the bottom-right block of luma CTU 500 is 34, which is the quantization parameter predictor, and 2 is the offset.

As can be seen in FIG. 5, for CTU 508 there is only one QG 510. However, within QG 510 there may be multiple different QP values. There may be deficiencies in determining QP values in such a manner. For example, better visual quality may be achieved if the QP values for the chroma blocks (e.g., chroma blocks having non-zero coefficients) are the same in a QG, and in the example illustrated in FIG. 5, the result of there being different QP values in QG 510 may result in sub-optimal visual quality. One way to address this issue would be to define smaller QGs (e.g., rather than having QG 510, divide QG 510 into many smaller QGs). However, in such cases, additional signaling would be needed for each of the QGs (e.g., an offset may need to be signalled for each QG), which negatively impacts bandwidth.

FIG. 6 is similar to FIG. 5 but provides an example where dual tree partitioning, instead of single tree partitioning is used. For instance, FIG. 6 illustrates luma CTU 600. Luma CTU 600 is similar to luma CTU 500 and includes QGs 602A, 602B, 602C, and 602D similar to QGs 502A-502D.

In a dual tree confirmation, the chroma CTU that corresponds to luma CTU 600 may be partitioned differently. For example, FIG. 6 illustrates chroma CTU 604 and chroma CTU 608. Chroma CTU 604 is one example of a corresponding chroma CTU to luma CTU 600, and chroma CTU 608 is another example of a corresponding chroma CTU to luma CTU 600.

In the example illustrated in FIG. 6, chroma CTU 604 includes three QGs 606A, 606B, and 606C. In some examples, to determine the QP value for each of QGs 606A-606c, video decoder 300 may access respective luma blocks (e.g., which are examples of quantization parameter predictors) and add an offset. In the example of FIG. 6, QGs 606A-606C may each include one chroma block, respectively. However, in the example of FIG. 6, each of the chroma blocks in QGs 606A-606C may correspond to multiple luma blocks in luma CTU 600. For example, QG 606A corresponds to the first N columns that include top-left and bottom-left luma blocks of luma CTU 600. In this example, video decoder 300 may select one of the two luma blocks (e.g., block of QG 602B) to determine the QP value for QG 606A. For instance, the QP value for QG 606A is 31 (e.g., the quantization parameter predictor), which is the QP value of the luma block of QG 602B plus an offset of 0.

QG 606B corresponds to top-left and bottom-left blocks of QG 602C and the left block of QG 602D. In this example, video decoder 300 may select one of these luma blocks (e.g., left block of QG 602D) to determine the QP value for QG 606B. In some examples, the block that contains the luma sample collocated with the chroma sample that is the center of the chroma block is chosen for the QP predictor. For instance, the QP value for QG 606B is 31 (e.g., the quantization parameter predictor), which is the QP value of the left block of QG 602D plus an offset of 0. QG 606C corresponds to top-right and bottom-right blocks of QG 602C and the right block of QG 602D. In this example, video decoder 300 may select one of these luma blocks (e.g., right block of QG 602D) to determine the QP value for QG 606C. For instance, the QP value for QG 606C is 34 (e.g., the quantization parameter predictor), which is the QP value of the right block of QG 602D plus an offset of 0.

In the example of chroma CTU 608, rather than chroma CTU 608 being divided into three QGs, chroma CTU 608 may be divided into only one QG 610. That is, the chroma blocks in chroma QG 610 comprise the chroma blocks of the CTU 608 and the chroma QG 610 includes all of chroma blocks of the CTU 610. In this example, for each of the chroma blocks of chroma CTU 608, video decoder 300 may access corresponding luma blocks and add an offset that is the same for each of the chroma blocks. In the example of FIG. 6, the offset is 0 for chroma CTU 608. For example, as shown in FIG. 6 for the left chroma block of CTU 608, the QP value is 31+0 because the QP value of the bottom-left luma block of CTU 600 is 31 (e.g., the quantization parameter predictor), and 0 is the offset. For the middle block of chroma CTU 608, the QP value is 31+0 because the QP value of the left block of QG 602D is 31 (e.g., quantization parameter predictor), and 0 is the offset. For the right block of chroma CTU 608, the QP value is 34+0 because the QP value of the right block of QG 602D is 34 (e.g., quantization parameter predictor), and 0 is the offset.

As can be seen in FIG. 6, for CTU 608 there is only one QG 610. However, within QG 610 there may be multiple different QP values. There may be deficiencies in determining QP values in such a manner. For example, better visual quality may be achieved if the QP values for the chroma blocks (e.g., chroma blocks having non-zero coefficients) are the same in a QG, and in the example illustrated in FIG. 6, the result of there being different QP values in QG 610 may result in sub-optimal visual quality. One way to address this issue would be to define smaller QGs (e.g., rather than having QG 610, divide QG 610 into many smaller QGs). However, in such cases, additional signaling would be needed for each of the QGs, which negatively impacts bandwidth.

This disclosure describes example techniques to improve the chroma QP derivation for hybrid transform-based video codecs, including signaling. The example techniques may be used independently, or in combination with other techniques.

In some examples, video encoder 200 and video decoder 300 may specify a chroma quantization group based on one or more syntax elements. The one or more syntax elements may include depth from CTU block size or related syntax elements. For example, when number of samples in a CTB is N, and the QP depth factor of k is specified, quantization groups are specified of size N>>k. In this manner, video encoder 200 and video decoder 300 may determine chroma blocks in a chroma quantization group (QG) of the video data. However, there may be other ways for determining chroma blocks in a chroma quantization group (QG) of the video data.

Video encoder 200 and video decoder 300 may be configured to determine a quantization parameter predictor that is the same for each of the chroma blocks of the chroma QG. As one example, video encoder 200 and video decoder 300 may determine a chroma sample from one of the chroma blocks and determine a corresponding luma block to the chroma blocks based on the determined chroma sample. For example, video encoder 200 and video decoder 300 may identify a chroma sample value to be used to identify a collocated luma sample. For example, video encoder 200 and video decoder 300 may identify a chroma block, chromaQpPredictorBlock, that may be used to derive an initial QP value (e.g., quantization parameter predictor) for the chroma QG. A block that has certain properties in the chroma QG is chosen as the chromaQpPredictorBlock.

In some examples, the first chroma CB (coding block) in the chroma QG is chosen as the chromaQpPredictorBlock. In such a case, one or more parameters of the first chroma coding block (e.g., width, height) may be specified and stored to be used by other blocks in the QG. In some examples, the first chroma CB that has non-zero coefficients in the chroma QG is chosen as the chromaQpPredictorBlock. In some examples, the chroma QG may itself be chosen as the chromaQpPredictorBlock.

Video encoder 200 and video decoder 300 may specify a sample value in chromaQpPredictorBlock that is used to identify a collocated (e.g., corresponding) luma sample. In some examples, video encoder 200 and video decoder 300 may use a center sample of the chroma coding block to identify the collocated luma sample. For example, if (x0, y0) represents the top-left sample of the current coding block, and W and H represent the width and height of the coding block, the center sample of the chroma coding block may be chosen as (x0+W/2, y0+H/2). In some examples, video encoder 200 and video decoder 300 may use a top-left sample of the chroma coding block to identify the collocated (e.g., corresponding) luma sample. For example, if (x0, y0) represents the top-left sample of the current coding block, and W and H represent the width and height of the coding block, the sample of the chroma coding block may be chosen as (x0, y0).

In general, any sample in the chromaQpPredictorBlock may be used to identify the collocated luma sample. The position of a sample may also vary based on one or more syntax elements in the bitstream. For example, for single tree, the center sample may be chosen as the specified chroma sample, and for dual tree, the top-left luma sample may be chosen. In some examples, the position may be chosen based on whether one or more collocated luma samples of chromaQpPredictorBlock have a deltaQP value associated.

Video encoder 200 and video decoder 300 may determine a QP value, $QP_L$, of the collocated luma sample. The $QP_L$ value may be used to derive the chroma QP. That is, video encoder 200 and video decoder 300 may determine a quantization parameter predictor based on a quantization parameter (e.g., $QP_L$) for the corresponding luma block (e.g., the luma block that includes the luma sample having quantization parameter of $QP_L$). For example, $QP_L$ is chosen as a QP value used for the block that contains the collocated luma sample. That is, the $QP_Y$ of the block containing the collocated luma sample is chosen as $QP_L$. In some examples, $QP_L$ may be chosen as $QP_Y$ added with an offset. The offset may be determined based on one or more factors including but not limited to other syntax elements, type of content (SDR/HDR/etc.), chroma format IDC (intra displacement compensation), chroma sampling location, etc. In other words, in some examples, $QP_Y$ (e.g., the quantization parameter of the corresponding luma block to chroma blocks in the chroma QG) may be used as the quantization parameter predictor ($QP_L$). In some examples, $QP_Y$ plus some offset may be used to determine the quantization parameter predictor ($QP_L$). The offset used to determine $QP_L$ should not be confused with the offset that is signaled to which the $QP_L$ is added to generate the QP value for the chroma QG. That is, in some examples, there may be a first offset that is used to add to $QP_Y$ to generate $QP_L$, and a second offset that is added to $QP_L$ to determine the QP value for the chroma QG.

Video encoder 200 and video decoder 300 may derive an initial QP value (e.g., quantization parameter predictor) for the chroma QG from $QP_L$. In some examples, the initial QP value of a chroma QG is set equal to $QP_L$. In some examples, video encoder 200 and video decoder 300 may determine the initial QP value of a chroma QG from $QP_L$ by applying a mapping function. One or more parameters of the mapping function may be signaled in the bitstream or pre-determined. For example, HEVC has chroma QP mapping tables specified, and in VVC Draft 6, chroma QP mapping tables are signaled in the bitstream.

For one or more coding blocks in the chroma QG, video encoder 200 and video decoder 300 may identify an initial QP value (e.g., quantization parameter predictor). In some examples, the initial QP value of the chroma CBs in the chroma QG is set equal to be the initial QP value of the chroma QG.

Video encoder 200 and video decoder 300 may use the initial QP value of a chroma coding block to derive the QP value to be used for the coding block. For two or more chroma CBs, video encoder 200 and video decoder 300 may use the initial QP value and chroma QP offsets to derive the chroma QP value to be used for the block. Stated another way, video encoder 200 and video decoder 300 may determine a quantization parameter predictor that is the same for each of the chroma blocks of the chroma QG. Video encoder 200 may determine a quantization parameter value for two or more of the chroma blocks in the chroma QG, and determine an offset value that is the same for the two or more of the chroma blocks of the chroma QG based on the quantization parameter value and the quantization parameter predictor. Video decoder 300 may determine an offset value that is the same for two or more of the chroma blocks of the chroma QG, and may determine a quantization parameter value for the two or more chroma blocks in the chroma QG based on the quantization parameter predictor and the offset value.

Video encoder 200 and video decoder 300 may code one or more samples in the block with a QP derived by one or more of the example techniques described in this disclosure. For example, video encoder 200 and video decoder 300 may encode or decode a current block of video data with QP values determined using one or more, including combinations, of the techniques described in this disclosure As one example, video decoder 300 may inverse quantize coefficients of one or more residual block for the chroma blocks based on the determined quantization parameter value, generate the one or more residual blocks based on the inverse quantized coefficients, and reconstruct the chroma blocks based on the one or more residual blocks. Video encoder 200 may quantize coefficients of one or more residual blocks for the chroma blocks based on the determined quantization parameter value and signal information indicative of the quantized coefficients and the offset value.

In some cases, video encoder 200 and video decoder 300 may derive chroma QGs separately for each chroma component. For example, video encoder 200 and video decoder 300 may derive a first QG for a first chroma component of a sample and derive a second QG for a second chroma component of the same sample.

In some examples, the example techniques described in this disclosure may apply for single-tree coding mode and or dual-tree coding modes. For example, video encoder 200 and video decoder 300 may be configured to partition a luma coding tree unit (CTU) (e.g., luma CTU 600) and a chroma CTU (e.g., chroma CTU 604 or chroma CTU 608) in dual tree generating luma blocks of the luma CTU 600 and chroma blocks of the CTU (e.g., chroma CTU 604 or chroma CTU 608) with different partitions The chroma blocks in the chroma QG 610 may comprise the chroma blocks of the CTU 608 and the chroma QG 610 includes all of chroma blocks of the CTU 608.

The above described some example ways in which to determine a quantization parameter predictor, such as based on the quantization parameter of a corresponding luma block. However, the example techniques are not so limited. There may be other ways in which to determine the quantization parameter predictor.

In some examples, the initial QP (e.g., quantization parameter predictor) for the chroma QG may be predicted by the QPs from the neighboring coded chroma QGs. For instance, to determine the quantization parameter predictor, video encoder 200 and video decoder 300 may determine the quantization parameter predictor based on quantization parameter values of neighboring chroma QGs.

In one example, video encoder 200 and video decoder 300 may predict the initial QP (e.g., quantization parameter predictor) by averaging the QP of the left neighboring chroma QG and the QP of the above neighboring chroma QG. If either the left or above chroma QG is not available, video encoder 200 and video decoder 300 may replace the corresponding QP by the QP derived from the corresponding luma area. In some examples, video encoder 200 and video decoder 300 may also use the QP of the last chroma coding block in the previous chroma QG in the derivation of the QP of the current QG. The derivation of QP from luma area can be one or a combination of the techniques described in this disclosure. In some examples, the initial QP of the chroma QG may be updated by a chroma offset value that is signaled for the chroma QG.

In some examples, video encoder 200 and video decoder 300 may derive (e.g., determine) the initial QP (e.g., quantization parameter predictor) of the chroma QG using one or more of the following QP values: QP of the left QG, QP of the top QG, QP of a luma sample that is collocated with one of the chroma samples in the chroma QG, and QP of the last coding chroma block in the previous chroma QG. For example, the initial QP may be derived by a weighted average of the three values as follows: initial QP=(QP−left+QP−above+2*f(QP−luma)+2)>>2, where f( ) may represent a chroma mapping table, or (QP−left+QP−above+*f(QP−luma)+QP−prev+2)>>2.

Under certain conditions (e.g., first chroma QG in a CTU row in a brick), video encoder 200 and video decoder 300 may derive the chroma QP from the luma QP only. In some cases, video encoder 200 and video decoder 300 may derive from neighboring QG and luma QG. In general, the QP derivation for the chroma QG may be dependent on the position of the chroma QG, e.g., in the picture or brick or CTU row, etc.

As described above, video encoder 200 and video decoder 300 may determine an offset value that is the same for two or more of the chroma blocks of the chroma QG. For example, to determine the offset value that is the same for two or more of the chroma blocks of the chroma QG, video encoder 200 and video decoder 300 may determine the offset value that is the same for all of the chroma blocks of the chroma QG. However, the techniques described in this disclosure are not so limited. In some examples, rather than the offset value being the same for all of the chroma blocks of the chroma QG, the offset value may be same for chroma blocks of the chroma QG that satisfy certain criteria. For example, video encoder 200 and video decoder may determine the offset value that is the same for the two or more of the chroma blocks having a size greater than a threshold size or at least one non-zero coefficient for corresponding residual blocks. The following describes examples of such criteria.

In some examples, the QP offset for a chroma block may be signaled for the first block that has non-zero coefficients. One or more blocks in the QG that have zero coefficients may take the initial QP of the chroma QG. In some examples, one or more blocks in the QG that have zero coefficients and that precede the first block that has non-zero coefficients may take the initial QP of the chroma QG.

The chroma QP offset may be signaled in a chroma QG for one or more blocks based on block characteristics (e.g., width, height, aspect ratio, number of samples, etc.). The determination of signaling in a chroma QG for one or more blocks based on block characteristics may not be based on the presence of non-zero coefficients (e.g., presence of non-zero coefficients is excluded from the characteristics). For example, when the chroma block size is larger than 32×32, or when chroma block has width or height larger than 32, the chroma QP offset may be signaled for the first block of the chroma QG. For other block sizes, the chroma QP offset may be signaled for the first block in the chroma QG that has non-zero coefficients. In some examples, when the chroma coding block has size more than 32 (width or height or both), the chroma offset may be signaled in the first block in the chroma coding block.

In some examples, when the chroma coding block has size in samples (width w, height h or both) larger than 32, the chroma offset may only apply to blocks with non-zero coefficients and may not apply to other blocks in the coding block that are before the first block with non-zero coefficients. In some examples, when the chroma coding block has size (w, h or both) larger than 32, the chroma offset may be signaled for all blocks with non-zero coefficients and may not apply to blocks in the coding block that are before the first block with non-zero coefficients. In some examples, when the chroma coding block has size (w, h or both) larger than 32, the chroma offset may be signaled for all blocks with non-zero coefficients and may not apply to blocks in the coding block that have non-zero coefficients.

In some examples, the chroma QP offset may be applied to the first block with non-zero coefficients in the coding block, and the chroma QP offset also applies to the subsequent blocks in the coding block. In some examples, one or more example techniques described in this disclosure may only apply to blocks within a quantization group. In some examples, one or more example techniques described in this disclosure may apply to all the coding blocks in the quantization group. In one example, the block size may be chosen to be value N where N is signaled in (or derived from) the bitstream or may be determined based on other block characteristics such as virtual pipeline data units (VPDU) constraints, maximum TB size, etc.

In some examples, the size of chroma QG may be restricted to be less than or equal to the size of the corresponding luma QG. For instance, the size of the chroma QG is restricted to be not greater than the size of the luma QG. In some examples, only one offset may be signaled for both luma and chroma QGs. In some examples, the size of the chroma QG is derived from the size of the luma QG with an offset or within a threshold. For example, if luma QG size is indicated by depth variable 4, chroma QG may be restricted be to within two values from the luma QG variable size (e.g., in the range [2,6]). In this example, chroma QG may be bigger than luma QG size but not greater than a threshold amount, and in some cases, not smaller than a threshold amount. The signaling of the chroma QG size variable may be modified to be delta coded from the luma QG size variable.

One or more restrictions or properties described above may only apply for some coding tree types (e.g., single tree configuration). One or more restrictions above may be applied only when some tools are enabled (e.g., when chroma-related tools are enabled such as CCLM, joint Cb-Cr coding, etc.).

In some examples, the size of the luma and chroma QG may be signaled separately. For some treeTypes (e.g., single tree), the same QG size is used for both luma and chroma. For instance, for single tree, the luma QG size is taken and applied for luma and chroma.

One or more example techniques disclosed in this disclosure may be further constrained by one or more characteristics of the samples on which the chroma mapping table is applied. Examples of the characteristics include block shape, aspect ratio, prediction mode used, characteristics of the neighboring block, and/or location of the samples with respect to the picture (near the boundaries or away from the boundaries, including picture boundaries, tile boundaries, slice boundaries, brick boundaries, etc.)

Some of the example techniques described above may be applied at video encoder 200 or video decoder 300, or both. Although various example techniques are described with respect to chroma components, the example techniques may also be applicable for luma components and for components in other color spaces that may be used to represent the video.

Although one or more example techniques described in this disclosure may be described with respect to a particular type of block, the example techniques may apply to different types of blocks such as coding blocks, prediction blocks, transform blocks or other types of blocks that specify some spatial partitioning of the picture.

The following describes examples of how one or more example techniques may be implemented. The following examples should not be considered limiting but merely as a few example ways for implementing the example techniques.

In a first example, the QP for the chroma QG is derived from the collocated luma block of the top-left sample of the first chroma coding block in the QG.

For this example, the syntax table is changed as follows, with text between <ADD> . . . </ADD> showing the addition:

| | Descriptor |
|---|---|
| coding_tree( x0, y0, cbWidth, cbHeight, qgOnY, | |
|     qgOnC, cbSubdiv, cqtDepth, mttDepth, depthOffset, | |
|         partIdx, treeTypeCurr, modeTypeCurr ) { | |
|   if( ( allowSplitBtVer \|\| allowSplitBtHor \|\| allowSplitTtVer \|\| | |
| allowSplitTtHor \|\| allowSplitQT ) | |
|   && ( x0 + cbWidth <= pic_width_in_luma_samples ) | |
|   && ( y0 + cbHeight <= pic_height_in_luma_samples ) ) | |
|     split_cu_flag | ae(v) |
|   if( cu_qp_delta_enabled_flag && qgOnY && cbSubdiv <= cu_qp_delta_subdiv ) { | |
|     IsCuQpDeltaCoded = 0 | |
|     CuQpDeltaVal = 0 | |
|     CuQgTopLeftX = x0 | |
|     CuQgTopLeftY = y0 | |
|   } | |
|   if( cu_chroma_qp_offset_enabled_flag && qgOnC && cbSubdiv <= cu_chroma_qp_offset_subdiv ) { | |
|     IsCuChromaQpOffsetCoded = 0 | |
|     <ADD>CuChromaQgTopLeftX = x0 | |
|     CuChromaQgTopLeftY = y0 | |
|   }</ADD> | |
|   if( split_cu_flag ) { | |
|     if( ( allowSplitBtVer \|\| allowSplitBtHor \|\| allowSplitTtVer \|\| | |
| allowSplitTtHor ) && | |
|       allowSplitQT ) | |
| dual_tree_implicit_qt_split( x0, y0, cbSize, cqtDepth ) { | |
|   cbSubdiv = 2 * cqtDepth | |
|   if( cbSize > 64 ) { | |
|     if( cu_qp_delta_enabled_flag && cbSubdiv <= cu_qp_delta_subdiv ) { | |
|       IsCuQpDeltaCoded = 0 | |
|       CuQpDeltaVal = 0 | |
|       CuQgTopLeftX = x0 | |
|       CuQgTopLeftY = y0 | |
|     } | |
|     if( cu_chroma_qp_offset_enabled_flag && cbSubdiv <= cu_chroma_qp_offset_subdiv ) { | |
|       IsCuChromaQpOffsetCoded = 0 | |
|       <ADD>CuChromaQgTopLeftX = x0 | |
|       CuChromaQgTopLeftY = y0 | |
|     }</ADD> | |
|     x1 = x0 + ( cbSize / 2 ) | |
|     y1 = y0 + ( cbSize / 2 ) | |

In some examples, the values of $CuQpOffset_{Cb}$, $CuQpOffset_{Cr}$, and $CuQpOffset_{CbCr}$ are set equal to zero in the two syntax tables above where the CuChromaQgTopLeftX/Y are initialized.

In the following <ADD> . . . </ADD> is used to show addition relative to VVC Draft 6 and text within <DELETE> . . . </DELETE> is used to show deletion relative to VVC Draft 6.

Inputs to this process are:
- a luma location (xCb,yCb) specifying the top-left luma sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed.

In this process, the luma quantization parameter $Qp'_Y$ and the chroma quantization parameters $Qp'_{Cb}$ and $Qp'_{Cr}$ are derived.

The luma location (xQg,yQg), specifies the top-left luma sample of the current <ADD>luma</ADD> quantization group relative to the top left luma sample of the current picture. The horizontal and vertical positions xQg and yQg are set equal to CuQgTopLeftX and CuQgTopLeftY, respectively.

NOTE—: The current quantization group is a rectangular region inside a coding tree block that shares the same $qP_{Y\_PRED}$. Its width and height are equal to the width and height of the coding tree node of which the top-left luma sample position is assigned to the variables CuQgTopLeftX and CuQgTopLeftY.

<ADD> The chroma location (xChromaQg, yChromaQg), specifies the top-left luma sample of the current chroma quantization group relative to the top left luma sample of the current picture. The horizontal and vertical positions xChromaQg and yChromaQg are set equal to CuChromaQgTopLeftX and CuChromaQgTopLeftY, respectively.</ADD>

When treeType is equal to SINGLE_TREE or DUAL_TREE_LUMA, the predicted luma quantization parameter $qP_{Y\_PRED}$ is derived by the following ordered steps:

1. The variable $qP_{Y\_PREV}$ is derived as follows:
   If one or more of the following conditions are true, $qP_{Y\_PREV}$ is set equal to $SliceQp_Y$:
   - The current quantization group is the first quantization group in a slice.
   - The current quantization group is the first quantization group in a brick.
   - The current quantization group is the first quantization group in a CTB row of a brick and entropy_coding_sync_enabled_flag is equal to 1.

Otherwise, $qP_{Y\_PREV}$ is set equal to the luma quantization parameter $Qp_Y$ of the last luma coding unit in the previous quantization group in decoding order.

2. The derivation process for neighbouring block availability as specified in clause 6.4.4 is invoked with the location (xCurr, yCurr) set equal to (xCb,yCb), the neighbouring location (xNbY, yNbY) set equal to (xQg−1, yQg), checkPredModeY set equal to FALSE, and cIdx set equal to 0 as inputs, and the output is assigned to availableA. The variable $qP_{Y\_A}$ is derived as follows:
   If one or more of the following conditions are true, $qP_{Y\_A}$ is set equal to $qP_{Y\_PREV}$:
   - availableA is equal to FALSE.
   - The CTB containing the luma coding block covering the luma location (xQg−1, yQg) is not equal to the CTB containing the current luma coding block at (xCb,yCb), i.e. all of the following conditions are true:
     - (xQg−1)>>CtbLog2SizeY is not equal to (xCb)>>CtbLog2SizeY
     - (yQg)>>CtbLog2SizeY is not equal to (yCb)>>CtbLog2SizeY Otherwise, $qP_{Y\_A}$ is set equal to the luma quantization parameter $Qp_Y$ of the coding unit containing the luma coding block covering (xQg−1, yQg).

3. The derivation process for neighbouring block availability as specified in clause 6.4.4 is invoked with the location (xCurr, yCurr) set equal to (xCb,yCb), the neighbouring location (xNbY, yNbY) set equal to (xQg, yQg−1), checkPredModeY set equal to FALSE, and cIdx set equal to 0 as inputs, and the output is assigned to availableB. The variable $qP_{Y\_B}$ is derived as follows:
   If one or more of the following conditions are true, $qP_{Y\_B}$ is set equal to $qP_{Y\_PREV}$:

availableB is equal to FALSE.
   The CTB containing the luma coding block covering the luma location (xQg,yQg−1) is not equal to the CTB containing the current luma coding block at (xCb,yCb), i.e. all of the following conditions are true:
      (xQg)>>CtbLog2SizeY is not equal to (xCb)>>CtbLog2SizeY
      (yQg−1)>>CtbLog2SizeY is not equal to (yCb)>>CtbLog2SizeY
   Otherwise, $qP_{Y\_B}$ is set equal to the luma quantization parameter $Qp_Y$ of the coding unit containing the luma coding block covering (xQg,yQg−1).
4. The predicted luma quantization parameter $qP_{Y\_PRED}$ is derived as follows:
   If all the following conditions are true, then $qP_{Y\_PRED}$ is set equal to the luma quantization parameter $Qp_Y$ of the coding unit containing the luma coding block covering (xQg,yQg−1):
      availableB is equal to TRUE.
      the current quantization group is the first quantization group in a CTB row within a brick and entropy_coding_sync_enabled_flag is equal to 0
   Otherwise, $qP_{Y\_PRED}$ is derived as follows:

$$qP_{Y\_PRED}=(qP_{Y\_A}+qP_{Y\_B}+1)>>1 \qquad (8\text{-}932)$$

The variable $Qp_Y$ is derived as follows:

$$Qp_Y=((qP_{Y\_PRED}+CuQpDeltaVal+64+2*QpBdOffset_Y)\%(64+QpBdOffset_Y))-QpBdOffset_Y \qquad (8\text{-}933)$$

The luma quantization parameter $Qp'_Y$ is derived as follows:

$$Qp'_Y=Qp_Y+QpBdOffset_Y \qquad (8\text{-}934)$$

When ChromaArrayType is not equal to 0 and treeType is equal to SINGLE_TREE or DUAL_TREE_CHROMA, the following applies:
   <DELETE>—When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).</DELETE>
   <ADD>—The variable qPYForChroma is set equal to the luma quantization parameter $Qp_Y$ of the luma coding unit that covers the luma location (xChromaQg, yChromaQg).</ADD>
The variables $qP_{Cb}$, $qP_{Cr}$ and $qP_{CbCr}$ are derived as follows:

$$qPi_{Chroma}=Clip3(-QpBdOffset_C, 63, \text{<ADD>}\ qPYForChroma\text{</ADD>}\text{<DELETE>}Qp_Y\text{</DELETE>}) \qquad (8\text{-}935)$$

$$qP_{Cb}=ChromaQpTable[0][qPi_{Chroma}] \qquad (8\text{-}936)$$

$$qP_{Cr}=ChromaQpTable[1][qPi_{Chroma}] \qquad (8\text{-}937)$$

$$qP_{CbCr}=ChromaQpTable[2][qPi_{Chroma}] \qquad (8\text{-}938)$$

The chroma quantization parameters for the Cb and Cr components, $Qp'_{Cb}$ and $Qp'_{Cr}$, and joint Cb-Cr coding $Qp'_{CbCr}$ are derived as follows:

$$Qp'_{Cb}=Clip3(-QpBdOffset_C,63, qP_{Cb}+pps\_cb\_qp\_offset+slice\_cb\_qp\_offset+CuQpOffset_{Cb})+QpBdOffset_C \qquad (8\text{-}939)$$

$$Qp'_{Cr}=Clip3(-QpBdOffset_C,63, qP_{Cr}+pps\_cr\_qp\_offset+slice\_cr\_qp\_offset+CuQpOffset_{Cr})+QpBdOffset_C \qquad (8\text{-}940)$$

$$Qp'_{CbCr}=Clip3(-QpBdOffset_C,63, qP_{CbCr}+pps\_cbcr\_qp\_offset+slice\_c\ bcr\_qp\_offset+CuQpOffset_{CbCr})+QpBdOffset_C \qquad (8\text{-}941)$$

In some examples, the chroma QP derivation is only applied to the dual tree coding case. The changes associated with this care as follows:
   When ChromaArrayType is not equal to 0 and treeType is equal to SINGLE_TREE or DUAL_TREE_CHROMA, the following applies:
      When treeType is equal to DUAL_TREE_CHROMA, the variable $Qp_Y$ is set equal to the luma quantization parameter $Qp_Y$ of the luma coding unit that covers the luma location (<DELETE>xCb+cbWidth/2, yCb+cbHeight/2</DELETE><ADD>xChromaQg, yChromaQg</ADD>).
   The variables $qP_{Cb}$, $qP_{Cr}$ and $qP_{CbCr}$ are derived as follows:

$$qPi_{Chroma}=Clip3(-QpBdOffset_C,63, Qp_Y) \qquad (8\text{-}935)$$

Figure 7:
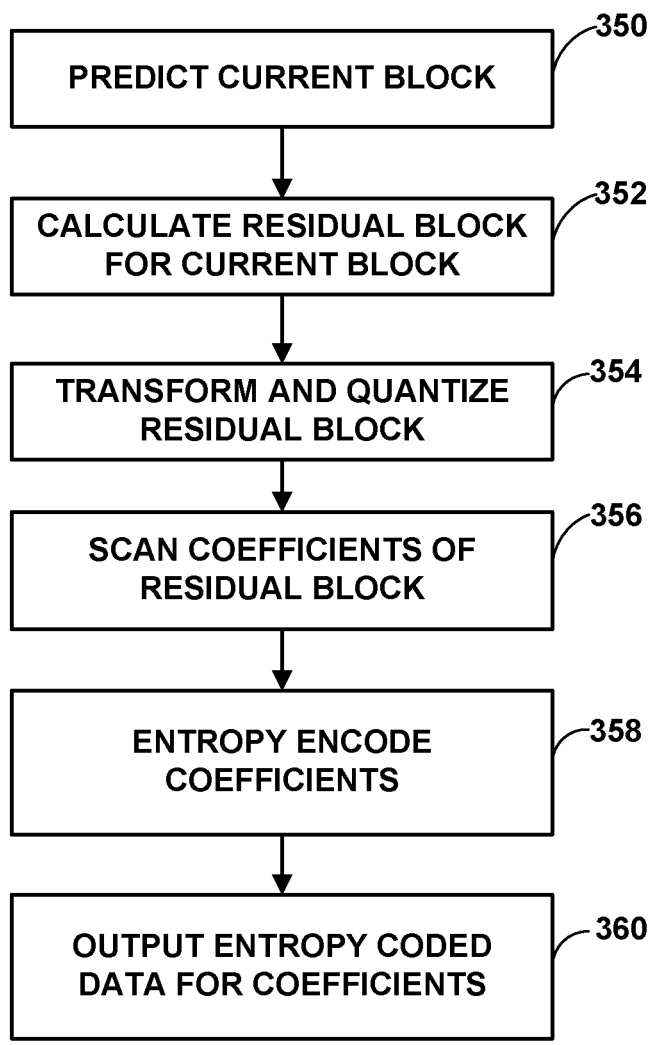
FIG. 7 is a flowchart illustrating an example method of encoding video data.

FIG. 7 is a flowchart illustrating an example method for encoding a current block. The current block may comprise a current CU. Although described with respect to video encoder 200 (FIGS. 1 and 3), it should be understood that other devices may be configured to perform a method similar to that of FIG. 7.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). In one or more examples, video encoder 200 may be configured to quantize coefficients using the example techniques described in this disclosure determining a quantization parameter (QP) value. Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy encoded data of the block (360).

Figure 8:
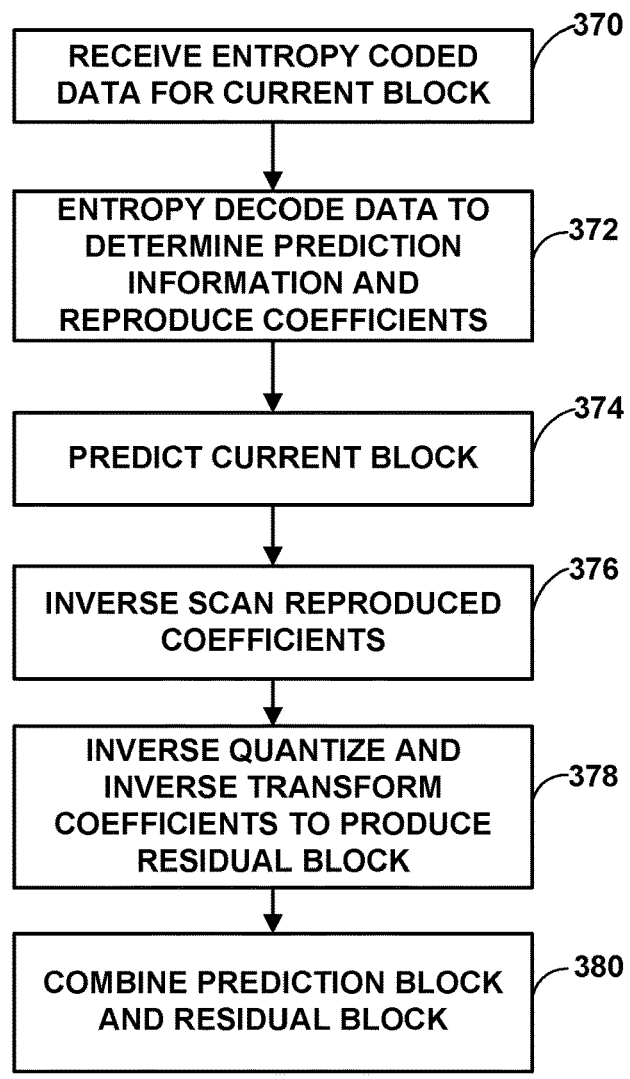
FIG. 8 is a flowchart illustrating an example method of decoding video data.

FIG. 8 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 8.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). In one or more examples, video decoder 300 may be configured to inverse-quantize coefficients using the example techniques described in this disclosure determining a quantization parameter (QP) value. Video decoder 300 may ultimately decode the current block by combining the prediction block and the residual block (380).

Figure 9:
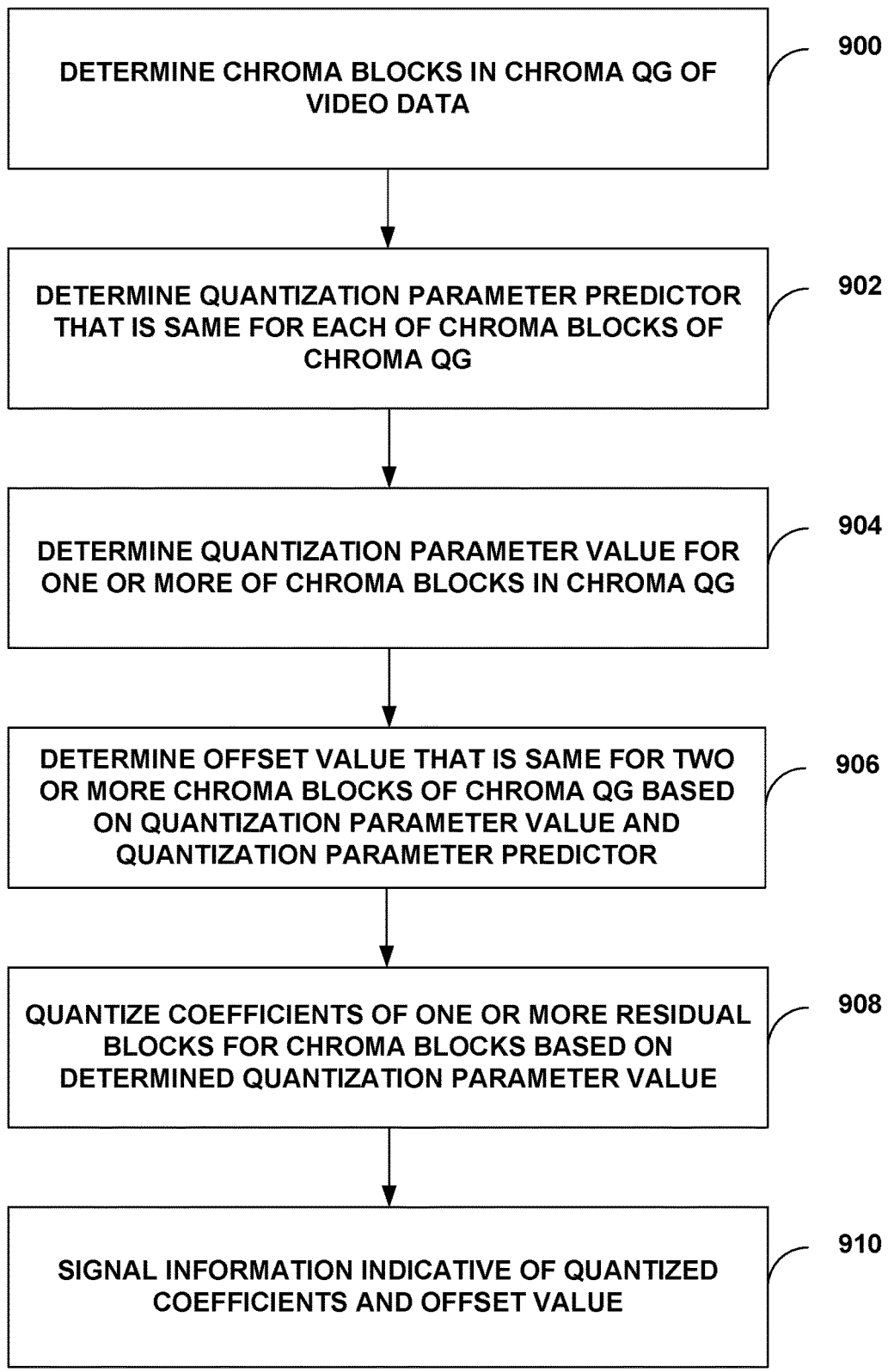
FIG. 9 is a flowchart illustrating another example method of encoding video data.

FIG. 9 is a flowchart illustrating an example method of encoding video data. The example techniques of FIG. 9 are described with respect to processing circuitry, such as processing circuitry of video encoder 200.

The processing circuitry of video encoder 200 may determine chroma blocks in a chroma quantization group (QG) of the video data (900). For example, the processing circuitry may determine the chroma blocks in the chroma QG based on size of chroma CTUs, size of luma QG, etc. As one example, a size of the chroma QG is restricted to less than or equal to a size of a corresponding luma QG. In some examples, the processing circuitry may partition a luma coding tree unit (CTU) (e.g., luma CTU 600) and a chroma CTU (e.g., chroma CTU 608) in dual tree generating luma blocks of the luma CTU 600 and chroma blocks of the CTU 608 with different partitions. As one example, the chroma blocks in the chroma QG 610 comprise the chroma blocks of the CTU 608 and the chroma QG 610 includes all of chroma blocks of the CTU 608.

The processing circuitry of video encoder 200 may determine a quantization parameter predictor that is the same for each of the chroma blocks of the chroma QG (902). As one example, as described above, the three chroma blocks in QG 610 of chroma CTU 608 of FIG. 6 have quantization parameter predictors of 31, 31, and 34, respectively. In one or more examples, rather than the chroma blocks in QG 610 of chroma CTU 608 having different quantization parameter predictors, the chroma blocks in QG 610 may each have the same quantization parameter predictor.

There may be various ways in which to the determine the quantization parameter predictor. As one example, the processing circuitry of video encoder 200 may determine a chroma sample from one of the chroma blocks, determine a corresponding luma block to the chroma blocks based on the determined chroma sample, and determine the quantization parameter predictor based on a quantization parameter value for the corresponding luma block. As another example, the processing circuitry of video encoder 200 may determine the quantization parameter predictor based on quantization parameter values of a neighboring chroma QG.

The processing circuitry of video encoder 200 may determine a quantization parameter value for one or more of the chroma blocks in the chroma QG (904). For example, the processing circuitry may determine the quantization parameter value based on rate distortion checks and deblock filtering needs. In some examples, the processing circuitry may determine the quantization parameter value for only one chroma block in the chroma QG and assign the determined quantization parameter value for the one or more blocks in the chroma QG.

The processing circuitry may determine an offset value that is the same for the two or more of the chroma blocks of the chroma QG based on the quantization parameter value and the quantization parameter predictor (906). In some examples, the processing circuitry may determine the offset value that is the same for all of the chroma blocks of the chroma QG. In some examples, the processing circuitry may determine the offset value that is the same for the two or more of the chroma blocks having a size greater than a threshold size or at least one non-zero coefficient for corresponding residual blocks.

The processing circuitry may quantize coefficients of one or more residual blocks for the chroma blocks based on the determined quantization parameter value (908). The processing circuitry may signal information indicative of the quantized coefficients and the offset value (910).

Figure 10:
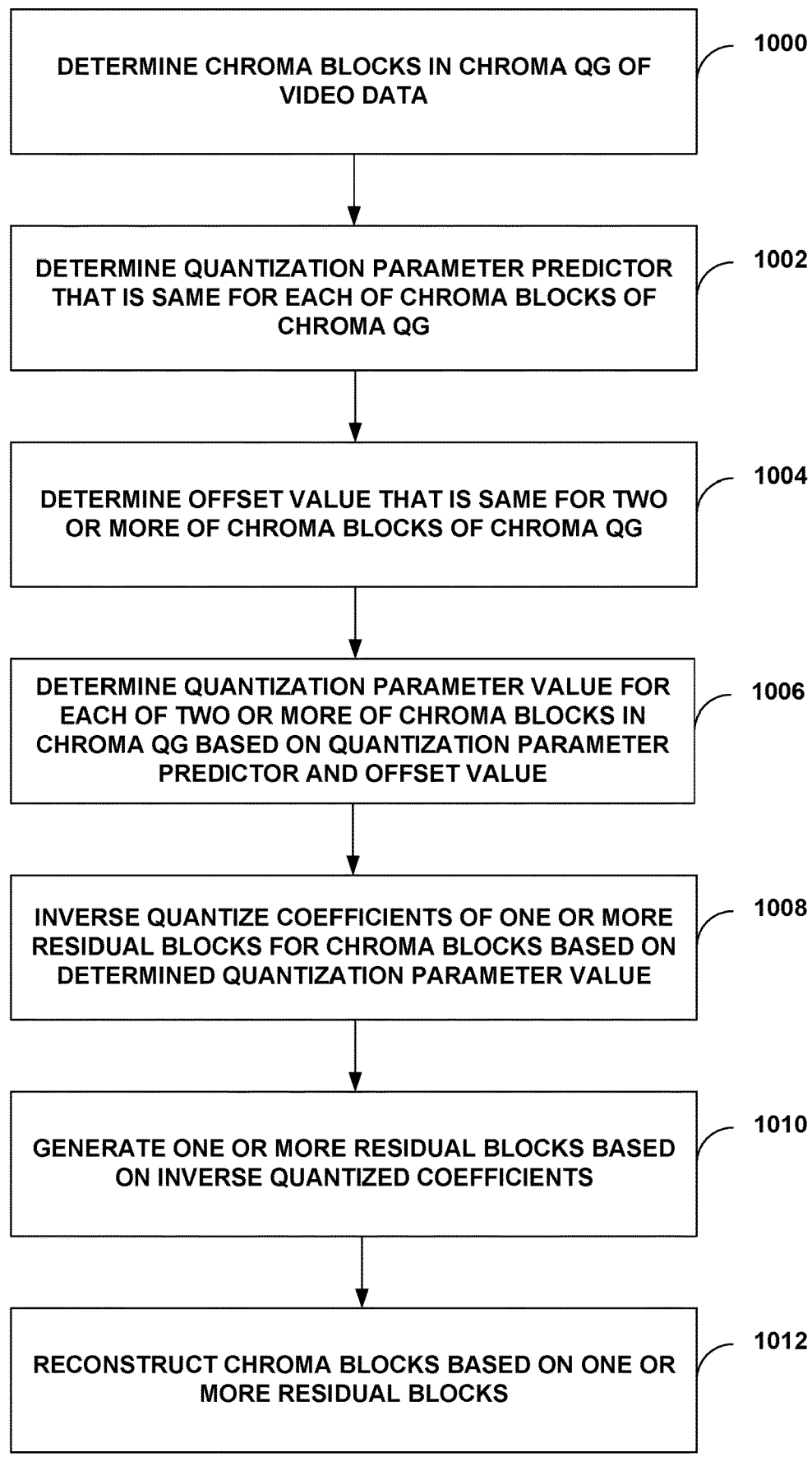
FIG. 10 is a flowchart illustrating another example method of decoding video data.

FIG. 10 is a flowchart illustrating an example method of decoding video data. The example techniques of FIG. 10 are described with respect to processing circuitry, such as processing circuitry of video decoder 300.

The processing circuitry of video decoder 300 may determine chroma blocks in a chroma quantization group (QG) of the video data (1000). For example, the processing circuitry may determine the chroma blocks in the chroma QG based on size of chroma CTUs, size of luma QG, etc. As one example, a size of the chroma QG is restricted to less than or equal to a size of a corresponding luma QG. In some examples, the processing circuitry may partition a luma coding tree unit (CTU) (e.g., luma CTU 600) and a chroma CTU (e.g., chroma CTU 608) in dual tree generating luma blocks of the luma CTU 600 and chroma blocks of the CTU 608 with different partitions. As one example, the chroma blocks in the chroma QG 610 comprise the chroma blocks of the CTU 608 and the chroma QG 610 includes all of chroma blocks of the CTU 608.

The processing circuitry of video decoder 300 may determine a quantization parameter predictor that is the same for each of the chroma blocks of the chroma QG (1002). As one example, as described above, the three chroma blocks in QG 610 of chroma CTU 608 of FIG. 6 have quantization parameter predictors of 31, 31, and 34, respectively. In one or more examples, rather than the chroma blocks in QG 610 of chroma CTU 608 having different quantization parameter predictors, the chroma blocks in QG 610 may each have the same quantization parameter predictor.

There may be various ways in which to the determine the quantization parameter predictor. As one example, the processing circuitry of video decoder 300 may determine a chroma sample from one of the chroma blocks, determine a corresponding luma block to the chroma blocks based on the determined chroma sample, and determine the quantization parameter predictor based on a quantization parameter value for the corresponding luma block. As another example, the processing circuitry of video decoder 300 may determine the quantization parameter predictor based on quantization parameter values of neighboring chroma QG.

The processing circuitry of video decoder 300 may determine an offset value that is the same for two or more of the chroma blocks of the chroma QG (1004). In some examples, the processing circuitry may determine the offset value that is the same for all of the chroma blocks of the chroma QG. In some examples, the processing circuitry may determine the offset value that is the same for the two or more of the chroma blocks having a size greater than a threshold size or at least one non-zero coefficient for corresponding residual blocks.

The processing circuitry of video decoder 300 may determine a quantization parameter value for each of the two or more of the chroma blocks in the chroma QG based on the quantization parameter predictor and the offset value (1006). The quantization parameter value may be the summation of the quantization parameter predictor and the offset value. However, there may be other ways in which to determine the quantization parameter value based on the quantization parameter predictor and the offset value (e.g., such as mapping).

The processing circuitry of video decoder 300 may inverse quantize coefficients of one or more residual blocks for the chroma blocks based on the determined quantization parameter value (1008). For example, inverse quantization unit 306 may inverse quantize coefficients of the one or more residual blocks for the chroma blocks based on the determined quantization parameter value. The processing circuitry of video decoder 300 may generate the one or more residual blocks based on the inverse quantized coefficients (1010). For example, inverse transform processing unit 308 may generate the one or more residual blocks based on the inverse quantized coefficients. The processing circuitry of video decoder 300 may reconstruct the chroma blocks based on the one or more residual blocks (1012). For example, reconstruction unit 310 may add the one or more residual blocks to one or more prediction blocks generated by prediction processing unit 304 to reconstruct the chroma blocks.

The following describes some example techniques that may be used together or in combination.

Example 1. A method of coding video data, the method comprising determining a chroma quantization group (QG) based on one or more syntax elements and coding a current block of the video data based on the determine chroma QG.

Example 2. The method of example 1, wherein determining the chroma QG comprises inferring the chroma QG based on the one or more syntax elements without receiving or signaling syntax elements that explicitly define the chroma QG.

Example 3. The method of any of examples 1 and 2, wherein the one or more syntax elements from which the chroma QG is determined comprise one or more of a depth from coded tree unit (CTU) block size.

Example 4. A method of coding video data, the method comprising determining a chroma predictor block, determining an initial quantization parameter (QP) value for a chroma quantization group (QG) based on the chroma predictor block, and coding a current block of the video data based on the determined QP value for the chroma QG.

Example 5. A method of coding video data, the method comprising determining a chroma predictor block, determining a sample value in the chroma predictor block, identifying a collocated luma sample based on the sample value in the chroma predictor block, and coding a current block of the video data based on the identified collocated luma sample.

Example 6. A method of coding video data, the method comprising determining a quantization parameter (QP) of a luma sample, the QP of the luma sample being $QP_L$, determining a chroma QP of a chroma sample collocated with the luma sample based on the $QP_L$, and coding a current block of the video data based on the determined chroma QP.

Example 7. A method of coding video data, the method comprising determining a quantization parameter (QP) of a luma sample, the QP of the luma sample being $QP_L$, determining an initial QP value for a chroma quantization group (QG) based on the $QP_L$, and coding a current block of the video data based on the determined initial QP for the chroma QG.

Example 8. A method of coding video data, the method comprising determining an initial quantization parameter (QP) value of a chroma coding block, determining a QP value for a coding block that includes the chroma coding block and a luma coding block based on the initial QP value for the chroma coding block, and coding the coding block based on the determined QP value.

Example 9. A method of coding video data, the method comprising determining a first quantization group (QG) for a first chroma component for a sample, determining a second QG for a second chroma component for the same sample position, and coding a current block of the video data based on the first QG and the second QG.

Example 10. A method comprising any or combination of examples 1-9.

Example 11. The method of example 10, wherein the method of example 10 is applied to single-tree coding mode or dual-tree coding mode.

Example 12. A method of coding video data, the method comprising determining a chroma quantization parameter (QP) offset for a chroma quantization group (QG) for one or more block based on block characteristics, wherein the block characteristics exclude presence of non-zero coefficients, and coding a current block of the video data based on the determined chroma QP offset.

Example 13. A method comprising any one or combination of examples 1-12.

Example 14. The method of example 13, wherein coding comprises decoding the current block.

Example 15. The method of example 13, wherein coding comprises encoding the current block.

Example 16. A device for coding video data, the device comprising a memory configured to store video data and processing circuitry configured to perform the method of any one or combination of examples 1-13.

Example 17. The device of example 16, wherein the processing circuitry comprises a video decoder configured to decode the current block.

Example 18. The device of example 16, wherein the processing circuitry comprises a video encoder configured to encode the current block.

Example 19. The device of any of examples 16-18, further comprising a display configured to display decoded video data.

Example 20. The device of any of examples 16-19, wherein the device comprises one or more of a camera, a computer, a mobile device, a broadcast receiver device, or a set-top box.

Example 21. A computer-readable storage medium having stored thereon instructions that, when executed, cause one or more processors to perform the method of any of examples 1-15.

Example 22. A device for coding video data, the device comprising means for performing the method of any of examples 1-15.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining chroma blocks in a chroma quantization group (QG) of the video data, wherein the chroma QG corresponds to a plurality of luma QGs, and each of the luma QGs includes one or more luma blocks;
    determining a quantization parameter predictor that is the same for each of the chroma blocks of the chroma QG;
    determining an offset value that is the same for two or more of the chroma blocks of the chroma QG, wherein the offset value is indicative of an adjustment in a degree of quantization;
    determining a quantization parameter value for each of the two or more of the chroma blocks in the chroma QG based on the quantization parameter predictor and the offset value, wherein the quantization parameter value equals a degree of quantization applied to coefficients of one or more transform coefficient blocks of the chroma blocks, wherein determining the quantization parameter value for each of the two or more of the chroma blocks comprises:
        determining the quantization parameter value for only one of the two or more chroma blocks in the chroma QG; and
        assigning the determined quantization parameter value for the other chroma blocks of the two or more chroma blocks in the chroma QG,
        wherein quantization parameter values for at least two of the plurality of luma QGs are different, and
        wherein quantization parameter values for all of the two or more chroma blocks in the chroma QG are the same;
    inverse quantizing the coefficients of the one or more transform coefficient blocks of the chroma blocks based on the determined quantization parameter value;
    generating one or more residual blocks based on the inverse quantized coefficients; and
    reconstructing the chroma blocks based on the one or more residual blocks.

2. The method of claim 1, wherein determining the quantization parameter predictor comprises:
    determining a chroma sample from one of the chroma blocks;
    determining a corresponding luma block, in one of the plurality of luma QGs, to the chroma blocks based on the determined chroma sample; and
    determining the quantization parameter predictor based on a quantization parameter value for the corresponding luma block.

3. The method of claim 1, wherein determining the quantization parameter predictor comprises determining the quantization parameter predictor based on quantization parameter values of a neighboring chroma QG.

4. The method of claim 1, wherein determining the offset value that is the same for two or more of the chroma blocks of the chroma QG comprises determining the offset value that is the same for all of the chroma blocks of the chroma QG.

5. The method of claim 1, wherein determining the offset value that is the same for the two or more of the chroma blocks comprises determining the offset value that is the same for the two or more of the chroma blocks having a size greater than a threshold size or having at least one non-zero coefficient for corresponding residual blocks, or a block that does not precede a first block in the QG that has non-zero coefficients.

6. The method of claim 1, further comprising:
partitioning a luma coding tree unit (CTU) and a chroma CTU in dual tree generating luma blocks of the luma CTU and chroma blocks of the CTU with different partitions, wherein the chroma blocks in the chroma QG comprise the chroma blocks of the CTU and the chroma QG includes all of the chroma blocks of the CTU such that the chroma QG is same size as the CTU.

7. The method of claim 1, wherein a size of the chroma QG is restricted to less than or equal to a size of one of the plurality of luma QGs that corresponds with the chroma QG.

8. A method of encoding video data, the method comprising:
determining chroma blocks in a chroma quantization group (QG) of the video data, wherein the chroma QG corresponds to a plurality of luma QGs, and each of the luma QGs includes one or more luma blocks;
determining a quantization parameter predictor that is the same for each of the chroma blocks of the chroma QG;
determining a quantization parameter value for two or more of the chroma blocks in the chroma QG, wherein the quantization parameter value equals a degree of quantization applied to coefficients of one or more residual blocks of the chroma blocks, wherein determining the quantization parameter value for the two or more of the chroma blocks comprises:
determining the quantization parameter value for only one of the two or more chroma blocks in the chroma QG; and
assigning the determined quantization parameter value for the other chroma blocks of the two or more chroma blocks in the chroma QG,
wherein quantization parameter values for at least two of the plurality of luma QGs are different, and
wherein quantization parameter values for all of the two or more chroma blocks in the chroma QG are the same;
determining an offset value that is the same for the two or more of the chroma blocks of the chroma QG based on the quantization parameter value and the quantization parameter predictor, wherein the offset value is indicative of an adjustment in a degree of quantization;
quantizing the coefficients of the one or more residual blocks of the chroma blocks based on the determined quantization parameter value; and
signaling information indicative of the quantized coefficients and the offset value.

9. The method of claim 8, wherein determining the quantization parameter predictor comprises:
determining a chroma sample from one of the chroma blocks; and
determining the quantization parameter predictor based on a quantization parameter value for a corresponding luma block, in one of the plurality of luma QGs, to the chroma blocks.

10. The method of claim 8, wherein determining the quantization parameter predictor comprises determining the quantization parameter predictor based on quantization parameter values of a neighboring chroma QG.

11. The method of claim 8, wherein determining the offset value that is the same for two or more of the chroma blocks of the chroma QG comprises determining the offset value that is the same for all of the chroma blocks of the chroma QG.

12. The method of claim 8, wherein determining the offset value that is the same for the two or more of the chroma blocks comprises determining the offset value that is the same for the two or more of the chroma blocks having a size greater than a threshold size or having at least one non-zero coefficient for corresponding residual blocks.

13. The method of claim 8, further comprising:
partitioning a luma coding tree unit (CTU) and a chroma CTU in dual tree generating luma blocks of the luma CTU and chroma blocks of the CTU with different partitions, wherein the chroma blocks in the chroma QG comprise the chroma blocks of the CTU and the chroma QG includes all of chroma blocks of the CTU such that the chroma QG is same size as the CTU.

14. The method of claim 8, wherein a size of the chroma QG is restricted to less than or equal to a size of one of the plurality of luma QGs that corresponds with the chroma QG.

15. A device for decoding video data, the device comprising:
memory configured to store video data; and
processing circuitry coupled to the memory and configured to:
determine chroma blocks in a chroma quantization group (QG) of the video data, wherein the chroma QG corresponds to a plurality of luma QGs, and each of the luma QGs includes one or more luma blocks;
determine a quantization parameter predictor that is the same for each of the chroma blocks of the chroma QG;
determine an offset value that is the same for two or more of the chroma blocks of the chroma QG, wherein the offset value is indicative of an adjustment in a degree of quantization;
determine a quantization parameter value for each of the two or more of the chroma blocks in the chroma QG based on the quantization parameter predictor and the offset value, wherein the quantization parameter value equals a degree of quantization applied to coefficients of one or more transform coefficient blocks of the chroma blocks, wherein to determine the quantization parameter value for each of the two or more of the chroma blocks, the processing circuitry is configured to:
determine the quantization parameter value for only one of the two or more chroma blocks in the chroma QG; and
assign the determined quantization parameter value for the other chroma blocks of the two or more chroma blocks in the chroma QG,
wherein quantization parameter values for at least two of the plurality of luma QGs are different, and
wherein quantization parameter values for all of the two or more chroma blocks in the chroma QG are the same;
inverse quantize the coefficients of the one or more transform coefficient blocks of the chroma blocks based on the determined quantization parameter value;
generate one or more residual blocks based on the inverse quantized coefficients; and
reconstruct the chroma blocks based on the one or more residual blocks.

16. The device of claim 15, wherein to determine the quantization parameter predictor, the processing circuitry is configured to:
determine a chroma sample from one of the chroma blocks;
determine a corresponding luma block, in one of the plurality of luma QGs, to the chroma blocks based on the determined chroma sample; and determine the quantization parameter predictor based on a quantization parameter value for the corresponding luma block.

17. The device of claim 15, wherein to determine the quantization parameter predictor, the processing circuitry is configured to determine the quantization parameter predictor based on quantization parameter values of a neighboring chroma QG.

18. The device of claim 15, wherein to determine the offset value that is the same for two or more of the chroma blocks of the chroma QG, the processing circuitry is configured to determine the offset value that is the same for all of the chroma blocks of the chroma QG.

19. The device of claim 15, wherein to determine the offset value that is the same for the two or more of the chroma blocks, the processing circuitry is configured to determine the offset value that is the same for the two or more of the chroma blocks having a size greater than a threshold size or having at least one non-zero coefficient for corresponding residual blocks, or a block that does not precede a first block in the QG that has non-zero coefficients.

20. The device of claim 15, wherein the processing circuitry is configured to:
partition a luma coding tree unit (CTU) and a chroma CTU in dual tree generating luma blocks of the luma CTU and chroma blocks of the CTU with different partitions, wherein the chroma blocks in the chroma QG comprise the chroma blocks of the CTU and the chroma QG includes all of the chroma blocks of the CTU such that the chroma QG is same size as the CTU.

21. The device of claim 15, wherein a size of the chroma QG is restricted to less than or equal to a size of one of the plurality of luma QGs that corresponds with the chroma QG.

22. The device of claim 15, further comprising a display configured to display decoded video data.

23. The device of claim 15, wherein the device comprises one of a camera, a computer, a wireless communication device, a broadcast receiver device, or a set-top box.

24. A non-transitory computer-readable storage medium storing instructions thereon that when executed cause one or more processors of a device for decoding video data to:

determine chroma blocks in a chroma quantization group (QG) of the video data, wherein the chroma QG corresponds to a plurality of luma QGs, and each of the luma QGs includes one or more luma blocks;
determine a quantization parameter predictor that is the same for each of the chroma blocks of the chroma QG;
determine an offset value that is the same for two or more of the chroma blocks of the chroma QG, wherein the offset value is indicative of an adjustment in a degree of quantization;
determine a quantization parameter value for the two or more of the chroma blocks in the chroma QG based on the quantization parameter predictor and the offset value, wherein the quantization parameter value equals a degree of quantization applied to coefficients of one or more transform coefficient blocks of the chroma blocks, wherein the instructions that cause the one or more processors to determine the quantization parameter value for each of the two or more of the chroma blocks comprise instructions that cause the one or more processors to:
determine the quantization parameter value for only one of the two or more chroma blocks in the chroma QG; and
assign the determined quantization parameter value for the other chroma blocks of the two or more chroma blocks in the chroma QG,
wherein quantization parameter values for at least two of the plurality of luma QGs are different, and
wherein quantization parameter values for all of the two or more chroma blocks in the chroma QG are the same;
inverse quantize the coefficients of the one or more transform coefficient blocks of the chroma blocks based on the determined quantization parameter value;
generate one or more residual blocks based on the inverse quantized coefficients; and
reconstruct the chroma blocks based on the one or more residual blocks.

\* \* \* \* \*